(12) United States Patent
Kuse et al.

(10) Patent No.: US 7,445,858 B2
(45) Date of Patent: *Nov. 4, 2008

(54) MAGNETIC RECORDING MEDIUM USING MAGNETIC POWDER HAVING A CORE PORTION AND AN OUTER LAYER PORTION INCLUDING A RARE EARTH ELEMENT AND MAGNETIC RECORDING CASSETTE

(75) Inventors: Sadamu Kuse, Minoo (JP); Tsugihiro Doi, Ibaraki (JP); Tetsutaro Inoue, Ikeda (JP); Mikio Kishimoto, Moriya (JP); Yuji Sasaki, Otokuni-gun (JP); Hideaki Watanabe, Otokuni-gun (JP)

(73) Assignee: Hitachi Maxell, Ltd., Ibaraki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/688,179

(22) Filed: Mar. 19, 2007

(65) Prior Publication Data
US 2007/0159722 A1   Jul. 12, 2007

Related U.S. Application Data

(62) Division of application No. 10/369,606, filed on Feb. 21, 2003, now Pat. No. 7,291,409.

(30) Foreign Application Priority Data

Mar. 18, 2002 (JP) ............................ P2002-074617
Sep. 20, 2002 (JP) ............................ P2002-274435

(51) Int. Cl.
*G11B 5/706* (2006.01)
*G11B 5/712* (2006.01)
*G11B 5/714* (2006.01)

(52) U.S. Cl. ................... 428/842.9; 428/842.6; 428/403; 360/132; 360/134

(58) Field of Classification Search ........................ None
See application file for complete search history.

(56) References Cited

U.S. PATENT DOCUMENTS

| | | | |
|---|---|---|---|
| 3,904,448 A | 9/1975 | Takahashi et al. | |
| 4,020,236 A | 4/1977 | Aonuma et al. | |
| 4,324,177 A | 4/1982 | Tsuji et al. | |
| 4,451,535 A | 5/1984 | Pingaud et al. | |
| 4,643,942 A | 2/1987 | Ohtsubo | |
| 4,952,444 A | 8/1990 | Kawamata et al. | |
| 5,156,922 A | 10/1992 | Mishima et al. | |
| 5,252,380 A | 10/1993 | Nakazumi et al. | |
| 5,380,905 A | 1/1995 | Haidos et al. | |
| 5,494,722 A | 2/1996 | Oka et al. | |
| 5,496,607 A | 3/1996 | Inaba et al. | |
| 5,518,804 A | 5/1996 | Mizuno et al. | |
| 5,637,390 A | 6/1997 | Isobe et al. | |
| 5,645,917 A | 7/1997 | Ejiri et al. | |
| 5,935,674 A | 8/1999 | Saito et al. | |
| 6,071,608 A | 6/2000 | Yoshida et al. | |
| 6,307,700 B1 | 10/2001 | Takayama | |
| 6,319,485 B1 | 11/2001 | Nagatomi et al. | |
| 6,372,338 B1 | 4/2002 | Jeffers et al. | |
| 6,517,934 B1 | 2/2003 | Kishimoto | |
| 6,534,168 B2 | 3/2003 | Naoe et al. | |
| 6,607,807 B2 | 8/2003 | Zinbo et al. | |
| 6,780,531 B2 | 8/2004 | Tani et al. | |
| 6,964,811 B2 | 11/2005 | Kishimoto et al. | |
| 7,238,439 B2 * | 7/2007 | Sasaki et al. | 428/842.5 |
| 7,267,896 B2 * | 9/2007 | Kuse et al. | 428/839.3 |
| 7,291,409 B2 * | 11/2007 | Kuse et al. | 428/842.9 |
| 2003/0194582 A1 | 10/2003 | Ishikawa et al. | |
| 2004/0089564 A1 | 5/2004 | Kuse et al. | |
| 2004/0247859 A1 | 12/2004 | Sasaki et al. | |
| 2005/0276999 A1 | 12/2005 | Kuse et al. | |
| 2006/0008645 A1 | 1/2006 | Kishimoto et al. | |

FOREIGN PATENT DOCUMENTS

DE         69326124         6/1994

(Continued)

OTHER PUBLICATIONS

Derwent Abstract translation of WO 2003/079332 A1 and AU 2003/211248 A1 (Derwent Acc. No. 2003-748694).

(Continued)

*Primary Examiner*—Kevin M Bernatz
(74) *Attorney, Agent, or Firm*—Birch, Stewart, Kolasch & Birch, LLP

(57) ABSTRACT

A magnetic recording medium comprising a non-magnetic support, at least one primer layer formed on one surface of the non-magnetic support, comprising a non-magnetic powder and a binder resin, at least one magnetic layer formed on the primer layer, comprising a magnetic powder and a binder resin, and a back layer formed on the other surface of the non-magnetic support, wherein the magnetic powder contained in the uppermost layer of the magnetic layer is a rare earth metal-iron type magnetic powder of substantially spherical or ellipsoidal particles comprising a rare earth element and iron or a transition metal which comprises iron, and has a number average particle size of 5 to 50 nm and an average axis ratio of 1 to 2, and the total thickness of the magnetic recording medium is less than 6 μm. This magnetic recording medium can achieve an excellent block error rate.

15 Claims, 5 Drawing Sheets

FOREIGN PATENT DOCUMENTS

| | | |
|---|---|---|
| EP | 0602533 | 6/1994 |
| EP | 1 071 102 A1 | 1/2001 |
| JP | 52-5720 A | 2/1977 |
| JP | 55-86103 A | 6/1980 |
| JP | 64-1297 B | 10/1980 |
| JP | 57-183629 A | 11/1982 |
| JP | 60-130103 A | 7/1985 |
| JP | 60-157719 A | 8/1985 |
| JP | 60-204862 | 10/1985 |
| JP | 60-50323 B | 11/1985 |
| JP | 7-06504 B | 9/1987 |
| JP | 63-187418 A | 8/1988 |
| JP | 63-191315 A | 8/1988 |
| JP | 03-049026 A | 3/1991 |
| JP | 3-97203 A | 4/1991 |
| JP | 3-101102 A | 4/1991 |
| JP | 4-19815 A | 1/1992 |
| JP | 04-248120 A | 9/1992 |
| JP | 4-318321 A | 11/1992 |
| JP | 5-73883 A | 3/1993 |
| JP | 5-90018 A | 4/1993 |
| JP | 5-217148 A | 8/1993 |
| JP | 05-234064 A | 9/1993 |
| JP | 5-274644 A | 10/1993 |
| JP | 5-298653 A | 11/1993 |
| JP | 06-025702 A | 2/1994 |
| JP | 6-36265 A | 2/1994 |
| JP | 6-18062 B | 3/1994 |
| JP | 06-139553 A | 5/1994 |
| JP | 10083906 | 3/1998 |
| JP | 11-126327 A | 5/1999 |
| JP | 11-126328 A | 5/1999 |
| JP | 11-213384 A | 8/1999 |
| JP | 11-238225 A | 8/1999 |
| JP | 11-297034 A | 10/1999 |
| JP | 11-339254 A | 10/1999 |
| JP | 11-340023 A | 12/1999 |
| JP | 2000-030238 A | 1/2000 |
| JP | 2000-40217 A | 2/2000 |
| JP | 2000-040218 A | 2/2000 |
| JP | 2000-0277311 A | 10/2000 |
| JP | 2000-293836 A | 10/2000 |
| JP | 2000-315312 A | 11/2000 |
| JP | 2001-43525 A | 2/2001 |
| JP | 2001-67649 A | 3/2001 |
| JP | 2001-081506 A | 3/2001 |
| JP | 2001-110164 A | 4/2001 |
| JP | 2001-148115 A | 5/2001 |
| JP | 2001-176715 A | 6/2001 |
| JP | 2001-181754 A | 7/2001 |
| JP | 2001-273620 A | 10/2001 |
| JP | 2001-273626 A | 10/2001 |
| JP | 2001-325720 A | 11/2001 |
| JP | 2001-338418 A | 12/2001 |
| JP | 2002-50029 A | 2/2002 |
| JP | 2002-056518 A | 2/2002 |
| JP | 2002-288817 A | 10/2002 |
| JP | 2003-073705 A | 3/2003 |
| WO | WO-00/48210 A1 | 8/2000 |

OTHER PUBLICATIONS

Nagatomi et al., Powder and Powder Metallurgy, vol. 46, No. 2, pp. 151-155, (1999).
Hattori et al., Transactions of the Magnetic Soc. of Japan, vol. 25, pp. 927-930, (2001).
U.S. Appl. No. 10/389,880, filed Mar. 18, 2003.
U.S. Appl. No. 10/489,735, filed Mar. 16, 2004.
U.S. Appl. No. 11/222,785, filed Sep. 12, 2005.
English language machine translation of JP-083906 (having a publication date of Mar. 31, 1998).

* cited by examiner

MAGNETIC RECORDING MEDIUM USING MAGNETIC POWDER HAVING A CORE PORTION AND AN OUTER LAYER PORTION INCLUDING A RARE EARTH ELEMENT AND MAGNETIC RECORDING CASSETTE

This application is a Divisional of application Ser. No. 10/369,606, filed on Feb. 21, 2003, for which priority is claimed under 35 U.S.C. § 120 and application Ser. No. 10/369,606 claims priority to Application No. 2002-074617 and Application No. 2002-274435, filed in Japan on Mar. 18, 2002 and Sep. 20, 2002, respectively, the entire contents of each of the above-referenced applications are hereby incorporated by reference.

TECHNICAL FIELD

The present invention relates to a magnetic recording medium having good high density recording properties, in particular, a coating type magnetic tape (hereinafter simply referred to as "a magnetic tape" or "tape"), and a magnetic recording cartridge.

BACKGROUND ART

Magnetic tapes have found various applications in audio tapes, videotapes, computer tapes, etc. in particular, in the field of magnetic tapes for data-backup, tapes with memory capacities of several tens to 100 GB per reel are commercialized in association with increased capacities of hard discs for back-up. A backup tape with a capacity of 1 TB or more has been proposed, and it is indispensable for such a backup tape to have a higher recording density.

In the production of a magnetic tape capable of meeting such a demand for higher recording density, advanced techniques are required for production of very fine magnetic powder, highly dense dispersion of such magnetic powder in a coating layer, smoothing of such a coating layer, and formation of a thinner magnetic layer.

To increase the recording density, recording signals with shorter wavelength and tracks with shorter pitches are required, and there has been emerged a system using servo tracks so that a reproduction head can correctly trace the tracks.

To meet mainly the demand for recording of signals with shorter wavelength, magnetic powder for use in magnetic tape have been improved to have more and more fine particle size and also improved in magnetic characteristics. In the field of the existing high recording density magnetic tapes, magnetic powders of ferromagnetic iron oxide, Co-modified ferromagnetic iron oxide, chromium oxide and the like, used in audio systems and household video tapes have been dominantly used. Presently, needle-shape metallic magnetic powder having a particle size in a major axis direction of 100 nm or so has been proposed. On the other hand, to prevent a decrease in output due to demagnetization in recording signals with shorter wavelengths, backup tapes with higher coercive forces have been vigorously developed year by year. As a result of such developments, backup tapes with coercive forces of about 198.9 kA/m have been accomplished by the use of iron-cobalt alloys (JP-A-3-49026, JP-A-5-234064, JP-A-6-25702, JP-A-6-139553, etc.).

In the meantime, the media-producing techniques have been significantly advanced by the development of binder resins having a variety of functional groups, the improvement of the dispersing technique for the above magnetic powder, and further the improvement of the technique of calendering after the coating step. These improvements have markedly improved the surface smoothness of magnetic layers and contributed greatly to an increase in output of signals with shorter wavelengths (for example, JP-B-64-1297, JP-B-7-60504, JP-A-4-19815, etc.).

In association with the recent high density recording, the recording wavelength becomes shorter and shorter. Therefore, in case where the thickness of a magnetic layer is large, the levels of the saturation magnetization and the coercive force of conventional magnetic powder are insufficient within the shortest recording wavelength region, so that the reproducing output decreases to a fraction thereof. Further, because the recording wavelength is very short, self demagnetization loss and thickness loss due to the thickness of a magnetic layer give adverse influences on the resolution, although such demagnetization loss and thickness loss which occur when recorded signals are reproduced have not arisen so serious problem so far. This problem cannot be overcome by the above improvement of the magnetic characteristics of magnetic powder and the improvement of the surfaces of magnetic layers by the medium-producing technique. Under such circumstances, it is proposed that the thickness of a magnetic layer should be reduced.

Generally, it is said that the effective thickness of a magnetic layer is about one third of the shortest recording wavelength used in the system. For example, the thickness of a magnetic layer is required to be about 0.1 μm when the shortest recording wavelength is 0.3 μm. With the trend of compacting a cassette (or a cartridge) for holding tape, a whole of magnetic tape is needed to be thinner so as to increase the recording capacity per volume. To meet such a demand, it is consequently needed to form a thinner magnetic layer. Further, to increase the recording density, a magnetic flux for writing which a magnetic head generates should have a very small area. In this connection, compacting of the magnetic head results in a smaller amount of magnetic flux generated thereby. In order for the above very small magnetic flux to cause a perfect magnetic inversion, it is necessary that a magnetic layer should be formed with a thinner thickness.

However, there arise other problems in the formation of a thinner magnetic layer. That is, when the thickness of a magnetic layer is reduced, the surface roughness of a non-magnetic support gives an adverse influence on the surface of the magnetic layer, so that the surface smoothness of the magnetic layer degrades. When a single magnetic layer is formed with a thin thickness, the solid content in a paint for magnetic layer should be decreased, or the amount of the paint to be applied should be decreased. However, the defects of coating are not eliminated and the filling of magnetic powder is not improved by these methods, which results in poor film strength. To overcome this problem, the following concurrent coating-and-laminating method is proposed: that is, in case where a thinner magnetic layer is formed by an improved medium-producing technique, a primer layer is provided between a non-magnetic support and a magnetic layer, and the upper magnetic layer is applied on the primer layer which is still in a wet state (JP-A-63-187418, JP-A-63-191315, JP-A-5-73883, JP-A-5-217148, JP-A-S-298653, etc.).

When the recording density in the tape-widthwise direction is increased by narrowing the width of the recording tracks, magnetic flux leaking from the magnetic tape is decreased. Therefore, it is needed that MR heads using magneto-resistance elements, which can achieve high output even when the magnetic fluxes are very small, are used for reproducing heads.

Examples of a magnetic recording medium which can correspond to MR heads are disclosed in JP-A-11-238225, JP-A-

2000-40217 and JP-A-2000-40218. In the magnetic recording media described in these publications, skewness of outputs from the MR heads is prevented by controlling the magnetic fluxes from the magnetic recording media (a product of a residual magnetic flux density and the thickness of a medium) to a specific value or less, or the thermal asperity of the MR heads is reduced by controlling the dents on the surface of the magnetic layer to a specified value or less.

When the width of the recording tracks is decreased, the reproducing output lowers due to off-track. To avoid such a problem, track servo control is needed. As types of such track servo control, there are an optical servo system (JP-A-11-213384, JP-A-1'-339254 and JP-A-2000-293836) and a magnetic servo system. In either of these systems, it is necessary that track servo control is performed on a magnetic tape which is drawn out from a magnetic tape cartridge (or a cassette tape) of single reel type which houses only one reel for winding the magnetic tape, in a box-shaped casing body. The reason for using a single reel type cartridge is that, when the tape-running speed is increased (for example, 2.5 m/second or higher), a tape cannot be reliably run in a two-reel type cartridge which has two reels for drawing out the tape and for winding the same. The two-reel type cartridge has other problems in that the dimensions of the cartridge become larger and that the memory capacity per volume becomes smaller.

As mentioned above, there are two types of track servo systems, i.e., the magnetic servo system and the optical servo system. In the former track servo system, servo track bands, which are explained below, are formed on a magnetic layer by magnetic recording, and servo tracking is performed by magnetically reading such servo track bands. In the latter optical servo type, servo track bands each consisting of an array of pits are formed on a backcoat layer by laser irradiation or the like, and servo tracking is performed by optically reading such servo track bands. Other than these types, there is such magnetic serve system in which magnetic servo signals are recorded on a magnetized backcoat layer (for example, JP-A-11-126327). Further, in other optical servo system, optical servo signals are recorded on a backcoat layer, using a material capable of absorbing light or the like (for example, JP-A-11-126328).

Here, the principle of the track servo will be shortly explained.

As shown in FIG. 7, in the magnetic tape 3 employing the magnetic servo system, the magnetic layer has servo bands 200 for track servo and data-tracks 300 for data recording, each of which extends along the length-wise direction of the tape. Each of the servo bands 200 consists of a plurality of servo signal-recording parts 201 which magnetically record servo-track numbers. A magnetic head array (not shown) for recording and reproducing data onto the magnetic tape consists of a pair of MR heads for servo tracking (for forward traveling and backward traveling), and 8×2 pairs of recording-reproducing heads, where the recording heads are magnetic induction type heads, while the reproducing heads are MR heads. The entire magnetic head array moves in linking with the signals from the MR heads for servo tracking, which read the servo signals. Thereby, the recording-reproducing heads move in the widthwise direction of the tape and reach the data tracks. For example, in the case of the magnetic head array consisting of the 8×2 pairs of the recording-reproducing heads, there are 8 data tracks for one servo track.

However, the improvement of the magnetic powder and the medium-fabricating techniques have now reached the uppermost limit. Particularly in the improvement of the magnetic powder of needle particle type, the particle size thereof in the major axis direction is reduced to about 100 nm as the smallest in view of practical use. This is because, when the particle size is smaller than about 100 nm, the specific surface area of the magnetic powder markedly increases, and the saturation magnetization lowers, and also, it becomes very difficult to disperse such magnetic powder in a binder resin.

The technical innovation of magnetic heads has made it possible to record signals on media having high coercive forces. Particularly in the lengthwise recording system, it is desirable that the coercive force of a magnetic layer should be as high as possible to an extent that the erasing of the recorded signals by a magnetic head is possible, so as to prevent a decrease in output because of demagnetization by recording and reproducing. Therefore, the practical and most effective method for improving the recording density of a magnetic recording medium is to increase the coercive force of a magnetic recording medium.

To suppress the influence of a decrease in output due to demagnetization by recording and reproducing which is the essential problem of the lengthwise recording system, it is effective to further decrease the thickness of a magnetic layer. However, there is a limit in the thickness of a magnetic layer, as long as the above magnetic powder having a needle particle size in the major axis direction of about 100 nm is used. The needle particles are generally arrayed such that the needle-pointed direction can be in parallel to the in-plane direction of a medium, because of the lengthwise orientation of the needle particles. However, some of the needle particles are arrayed vertically to the plane of the medium, since there is a distribution in the dispersion of the particles. Because of such needle particles, the surface of the medium becomes uneven to increase the level of noises. This problem becomes more serious as the thickness of the magnetic layer is more and more thin.

In case where a magnetic layer is formed with a thinner thickness, it is needed to dilute a paint for magnetic coating with a large amount of an organic solvent. The conventional needle particle type magnetic powder tends to agglomerate paints for magnetic coating. In addition, the large amount of the organic solvent is evaporated off when the magnetic layer is dried, which degrades the orientation of the magnetic powder. Thus, the lengthwise recording tape medium becomes poor in the orientation, and it becomes difficult to obtain desired electromagnetic conversing characteristics therefrom because of degradation of the orientation and the surface of the magnetic layer, even though the magnetic layer is formed thinner. In spite of the known fact that the use of a thinner magnetic layer is effective to improve the recording characteristics in the lengthwise recording system, it is still difficult to obtain a coating type magnetic recording medium which comprises a magnetic layer with a far reduced thickness, insofar as the conventional needle particle type magnetic powder is used.

Among several kinds of magnetic powder which hitherto have been proposed, barium ferrite magnetic powder is known which comprises plate particles and has a particle size of about 50 nm (for example, JP-B-60-50323, JP-B-6-18062, etc.). This barium ferrite magnetic powder is more suitable for a thin layer coating type magnetic recording medium, than the needle particle type magnetic powder, because of the particle shape and particle size of the barium ferrite magnetic powder. However, since the barium ferrite magnetic powder is an oxide, its saturation magnetization is about 7.5 µWb/g at most, and therefore, it is theoretically impossible to obtain saturation magnetization of 12.6 µWb/g or more which needle particle type metal or alloy magnetic powder can show. The use of the barium ferrite magnetic powder makes it possible to produce a coating type magnetic recording medium having a thin magnetic layer, but is unsuitable for a high density magnetic recording medium, because the output is low due to low magnetic flux density. Furthermore, the barium ferrite powder particles strongly agglomerate because of the magnetic interaction of the plate particles, and are hardly dissociated to discrete plate particles in a dispersing process. For this reason, the foregoing needle particle type magnetic powder has been dominantly used as the magnetic powder for high density magnetic recording media.

As is understood from the above description, in the formation of a magnetic layer with a thin thickness which is one of the effective methods for improving the recording density of a magnetic recording medium, it is very important to maintain the coercive force and the saturation magnetization of magnetic powder at values as high as possible and simultaneously to reduce the particle size thereof. To achieve this subject matter, the present inventors, firstly, have paid their attentions on the magnetic characteristics of the conventional magnetic powder and found that a theoretical limit is present in achieving a higher coercive force since the conventional needle particle type magnetic powder gains a coercive force based on the shape anisotropy induced by its needle particles. In other words, in the shape anisotropy, the magnitude of the magnetic anisotropy is expressed by $2\pi Is$ (wherein 'Is' represents saturation magnetization), and is proportional to the saturation magnetization. Therefore, the coercive force of the needle particle type magnetic powder based on the shape anisotropy becomes larger in proportion to an increase in saturation magnetization.

As is well known from the Slater-Pauling curve, the saturation magnetization of a metal or an alloy, for example, a Fe—Co alloy, shows a maximal value at the ratio of Fe/Co of about 70/30. Therefore, the coercive force of this alloy shows a maximal value at the above composition ratio. Needle particle type magnetic powder of Fe—Co alloy in the ratio about 70/30 has already been practically used. However, as has been described above, whenever the needle particle type magnetic powder is used, the coercive force thereof is theoretically limited to about 198.9 kA/m at most at the present, and it is difficult to achieve a higher coercive force under the present circumstances. Therefore, the use of such needle particle type magnetic powder is unsuitable for a thin layer coating type magnetic recording medium.

The magnitude of magnetic anisotropy in the shape anisotropy is expressed by $2\pi Is$ as mentioned above, and the coefficient is represented by $2\pi$ when the an aspect of magnetic powder (the particle length/the particle diameter) is not smaller than about 5. When the an aspect is smaller than 5, the coefficient rapidly becomes smaller. When the particle shape is spherical, the anisotropy thereof vanishes. In other words, in the state of the art, insofar as a magnetic material such as a Fe metal, a Fe—Co alloy or the like is used as magnetic powder, the particle shape of the magnetic powder inevitably and theoretically results in the shape of needle.

As described above, a primer layer with a thickness of about 2.0 μm is formed on an non-magnetic support, and a magnetic layer with a thickness of about 0.15 to about 0.2 μm is formed on the primer layer, in order to improve the characteristics of recording/reproducing of signals with short wavelength. To further improve the recording density, preferably, a magnetic recording medium comprises at least one magnetic layer, the uppermost magnetic layer (which will simply be referred to as "magnetic layer") has a thickness of 0.09 μm or less, a primer layer has a thickness of 0.9 μm or less, a non-magnetic support has a thickness of 4.5 μm or less, a back layer has a thickness of 0.5 μm or less, and thus the total thickness of the magnetic recording medium is decreased to less than 6.0 μm. The total thickness of the magnetic recording medium is more preferably 5 μm or less, particularly preferably 4.5 μm or less, most preferably 4 μm or less. Practically, the total thickness of the magnetic recording medium is at least 2.5 μm. To decrease the thickness of the magnetic layer to 0.09 μm or less, the magnetic powder having a particle size of 50 nm or less, preferably 30 nm or less should be used. In view of the primary object to decrease the total thickness of the tape, it is not desirable to form a further primer layer for stably apply the primer layer having a thickness of 0.9 μm on the non-magnetic support. Therefore, this measure cannot be employed. Thus, a method for apply a stable thin layer is ultimately required.

To correctly trace tracks in correspondence with track pitches which have become narrower and narrower, it is necessary that the spacing dimensions between the tape edge and data tracks and between the servo track and data tracks should be kept constant, and thus the higher levels of the dimensional stability against temperature and humidity have been required.

SUMMARY OF THE INVENTION

An object of the present invention is to provide a magnetic tape, which can solve the above various problems and has a high recording density capable of corresponding to a recording capacity of 1 TB or more per one reel of tape, and a magnetic tape cartridge comprising the same.

To achieve the above object, the characteristics of magnetic powder necessary for markedly increasing the recording density of a coating type magnetic recording medium which comprises a thin magnetic layer are described in the following items (1) to (5), and raw materials and a production process suitable for such a magnetic recording medium have been researched and developed under these basic guides (1) to (5).

(1) Magnetic powder having a coercive force as high as possible, to an extent that the erasing of records with a magnetic head is possible.

(2) Magnetic powder comprising, as a main component, iron which has the largest saturation magnetization and is abundantly present as a resource.

(3) Magnetic powder of a metal, an alloy or a metal compound to achieve a high saturation magnetization (4) Magnetic powder having a particle shape close to a sphere having the smallest specific surface area.

(5) Magnetic powder comprising as fine particles as possible, to an extent that the magnetic powder can maintain saturation magnetization.

(6) Magnetic powder having an uniaxially magnetic anisotropy in which the magnetization is easy in a single direction.

The present inventors have researched magnetic powder which can satisfy all the above properties, and found that substantially spherical or ellipsoidal rare earth element-iron or iron nitride magnetic powder (which will be collectively referred to as "rare earth element-iron type magnetic powder"), which has specific structures such that an average particle size is 5 to 50 nm, preferably 5 to 30 nm and an axis ratio (a ratio of a major (longer) axis length to a minor (shorter) axis length) is 1 to 2, preferably 1 to 1.5, satisfies all the above guides (1) to (6), and that an excellent high density recording magnetic recording medium can be obtained when a coating type magnetic recording medium is produced using such a rare earth element-iron type magnetic powder.

The present invention has been completed based on the above finding and provides the following magnetic recording medium:

a magnetic recording medium comprising a non-magnetic support, at least one primer layer formed on one surface of the non-magnetic support, comprising a non-magnetic powder and a binder resin, at least one magnetic layer formed on the primer layer, comprising a magnetic powder and a binder resin, and a back layer formed on the other surface of the non-magnetic support, wherein the magnetic powder contained in the uppermost layer of the magnetic layer is a rare earth metal-iron type magnetic powder of substantially spherical or ellipsoidal particles comprising a rare earth element and iron or a transition metal which comprises iron, and has a number average particle size of 5 to 50 nm and an average axis ratio of 1 to 2, and the total thickness of the magnetic recording medium is less than 6 μm.

Preferably, the thickness of the uppermost magnetic layer (hereinafter simply referred to as "magnetic layer") is preferably 0.09 μm or less, since the high density recording is possible. Needless to say, the substantially spherical or ellipsoidal rare earth element-iron type magnetic powder should have a particle size smaller than the thickness of the uppermost magnetic layer.

Although the rare earth element-iron type magnetic powder having the above specific structure is a magnetic powder consisting of ultra fine particles of substantially spherical or ellipsoidal shape, a magnetic recording medium comprising such a magnetic powder easily achieves a high coercive force and a high magnetic flux density. The term "substantially spherical of ellipsoidal" or "substantially spherical or substantially ellipsoidal" used herein is intended to include "spherical" to "ellipsoidal" particles having uneven surfaces or slightly deformed particles as shown in the photographs of FIG. 3, etc.

Furthermore, it has also been found that a magnetic recording medium comprising the substantially spherical or ellipsoidal rare earth element-iron type magnetic powder having a very small particle size has better recording characteristics than magnetic recording media comprising a conventional acicular shape magnetic powder, since the magnetic interaction between the magnetic particles is small and thus quick reversal of magnetization is possible so that the domain of reversal of magnetization is narrowed. Further, it has been found that, when the thickness of the magnetic layer is as thin as 0.09 μm or lesser while the magnetic recording medium of the present invention exhibits the effects, the influence of demagnetization due to a demagnetizing field decreases and thus the magnetic recording medium has good recording characteristics even with a coercive force of about 80 kA/m (1005 Oe).

However, in view of erroneous erasing caused by an external magnetic field, for example, a magnet, the magnetic recording medium of the present invention preferably has a coercive force of 160 kA/m (2010 Oe) or more, more preferably 180 kA/m (2261 Oe) or more, particularly preferably 200 kA/m (2512 Oe) or more. The upper limit of the coercive force is not limited. By taking the recording ability of the magnetic head into account, the coercive force is currently 400 kA/m (5024 Oe) or less. When the magnetic layer has a thickness of 0.09 μm or less, the magnetic recording medium having a high coercive force of 200 kA/m to 400 kA/m can have a good overwriting property.

The thinning of a primer layer and also the dimensional stability of the primer layer against temperature and humidity have been researched. As a result, it has been found that when a primer contains plate particles having a number average particle size of 10 nm to 100 nm (hereinafter simply referred to as "plate particles"), it has a uniform thickness and good surface smoothness and good dimensional stability against temperature and humidity.

BEST EMBODIMENTS FOR WORKING THE INVENTION

Figure 1:
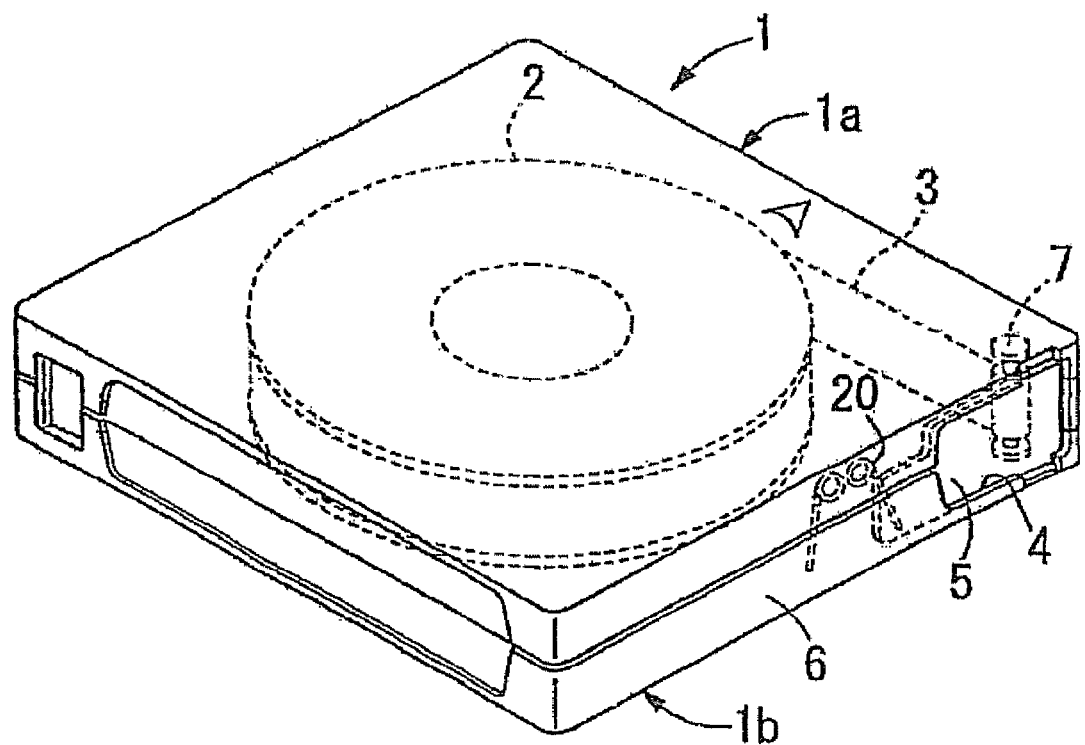
FIG. 1 is a perspective view of a general magnetic tape cartridge according to the present invention.

With the conventional acicular iron-cobalt alloy magnetic powder, which is used for high density coating type magnetic recording medium, the coercive force (1) is reaching the theoretical limit among the properties of the above basic guides. In connection with the particle size (5), it is difficult to disperse the powder in a binder, if the particle size is further decreased from the current particle size. In addition, the most serious problem is that it is impossible to achieve the properties (4) and (6) at the same time, because the acicular ratio can be reduced only to about 5 since the coercive force is based on the shape anisotropy, that is, the acicular shape, and if the acicular ratio is further decreased to less than 5, the uniaxial anisotropy deteriorates and thus the coercive force becomes too small.

From the viewpoint different from the magnetic powders based on the shape magnetic anisotropy, the present inventors have synthesized various magnetic powders to improve the magnetic properties in accordance with the above-described basic guideline, and checked the magnetic anisotropy of the magnetic powders. Then, it has been found that the rare earth element-iron magnetic materials comprising a rare earth element and iron as constituent elements have large crystalline magnetic anisotropy, and therefore it is not necessary to form the particles in an acicular shape and that, when the particles are in the substantially spherical or ellipsoidal shape, the magnetic powder has a large coercive force in one direction. Herein, the substantially ellipsoidal magnetic powder particles mean those having a ratio of the major axis to the minor axis of 2 or less, preferably 1.5 or less. Therefore, the magnetic powder particles of the present invention have essentially different shapes from those of the conventional powder particles for the magnetic recording media.

Examples of the substantially spherical or ellipsoidal magnetic powder are rare earth element-iron type magnetic powders such as rare earth element-iron-boron magnetic powder (JP-A-2001-181754), rare earth-iron magnetic powder (JP-A-2002-56518), etc. As the rare earth element contained in such magnetic powders, at least one element selected from the group consisting of yttrium, ytterbium, cesium, praseodymium, samarium, lanthanum, europium, neodymium and terbium is used. Among them, neodymium (Nd), samarium (Sm), terbium (Tb) and/or yttrium (Y) are preferably used, since a high coercive force can be easily attained.

Although no rare earth element is contained, substantially spherical iron nitride magnetic powder comprising a $Fe_{16}N_2$ phase and having a BET specific surface area of at least 10 $m^2/g$ is known (JP-A-2000-277311). The present inventors improved such an iron nitride magnetic powder and obtained a rare earth element-iron nitride magnetic powder which is suitable for a high density recording magnetic recording medium according to the present invention.

The main point of the improvement is that the rare earth element, which has good effects on the prevention of sintering, the increase of a coercive force and the stability (corrosion resistance), is contained primarily in the outer layer of the particle of the magnetic powder, to form the chemically stable fine particle magnetic powder having a high coercive force of 200 kA/m or more and a BET specific surface area of 40 $m^2/g$ to 100 $m^2/g$ which is suitable for high density recording. When the rare earth metal is contained primarily in the outer layer of the particle of the magnetic powder, and the magnetic powder is stabilized by oxidization, the saturation magnetization of the magnetic powder is controlled in a range from 10 to 20 µWb/g, whereby the rare earth element-iron nitride magnetic powder has excellent dispersibility in a paint and oxidation stability. The above improvement can provide the magnetic powder which is particularly suitable as a magnetic powder to be contained in the uppermost magnetic layer. The rare earth element-iron nitride magnetic powder obtained in the above has a coercive force of 200 kA/m or more, consists of fine particles, and has good dispersibility and chemical stability in the preparation of a magnetic paint. Therefore, the rare earth element-iron nitride magnetic powder is more preferable as a magnetic powder to be contained in the uppermost magnetic layer according to the present invention than the rare earth element-iron-boron magnetic powder, the rare earth element-iron magnetic powder, and the iron nitride magnetic powder comprising mainly the $Fe_{16}N_2$ phase but no rare earth element.

When the substantially spherical or ellipsoidal rare earth element-iron or rare earth element-iron nitride magnetic powder is used in the coating type magnetic recording medium having a small thickness, in particular, a total thickness of less than 6 µm, the high coercive force and high saturation magnetic flux density of the uppermost magnetic layer, the uniform dispersion of the magnetic powder in the magnetic layer due to the increase of the dispersibility in the paint and the improvement of the oxidation stability are achieved at the same time. Thus, a high output and a high C/N are attained.

As described above, the rare earth element-iron type magnetic powder used in the present invention are roughly divided into a rare earth element-iron magnetic powder containing mainly metal iron or an iron alloy in the core part and a rare earth element-iron nitride magnetic powder containing mainly an iron nitride phase, preferably the $Fe_{16}N_2$ phase in the core part. Each type magnetic powder will be explained.

Rare Earth Element-Iron Magnetic Powder Containing Mainly Metal Iron or an Iron Alloy in the Core Part A rare earth element-iron magnetic powder containing mainly metal iron or an iron alloy in the core part has the highest saturation magnetization, when the core part consists of an iron-cobalt alloy. The contents of iron and cobalt in the magnetic powder are preferably such that the atomic ratio of cobalt to iron is 3:97 to 40:60. Since the metal iron or the iron alloy has no shape anisotropy, a coercive force is low. When the magnetic powder contains 0.2 to 20 atomic % of a rare earth element based on the iron, the coercive force significantly increases. In particular, when the rare earth element is primarily contained in the outer layer part surrounding the core part, the coercive force is further increased.

Rare Earth Element-Iron Nitride Magnetic Powder Containing Mainly an Iron Nitride Phase in the Core Part When the outer layer of the particles of the rare earth element-iron nitride magnetic powder containing mainly an iron nitride phase in the core part is covered with 0.05 to 20 atomic %, preferably 0.2 to 20 atomic % of a rare earth element based on the iron, a chemically stable magnetic powder having a coercive force of 200 kA/m (2512 Oe) or more and a BET specific surface area of 40 to 100 $m^2/g$ can be obtained. The covering of the magnetic powder particles with the rare earth element and the stabilization by oxidization can control the saturation magnetization of the magnetic powder in a range of 10 to 20 µWb/g (79.6 to 159.2 $Am^2/kg$, 79.6 to 159.2 emu/g), and thus the rare earth element-iron nitride magnetic powder having the good dispersibility and oxidization stability in the paint is obtained. The core part of this magnetic part consists mainly of the $Fe_{16}N_2$ phase, or the $Fe_{16}N_2$ phase and the α-Fe phase, and the content of nitrogen atoms is 1.0 to 20 atomic % of the iron. A part of the iron (40 atomic % or less) may be replaced with other transition metal element. However, when a large amount of cobalt is added, the nitriding reaction takes a long time. Thus, the amount of cobalt is usually 10 atomic % or less. The rare earth element-iron type magnetic powder containing the iron nitride phase in the core part, that is, the rare earth element-iron nitride magnetic powder, is particularly suitable as a magnetic powder to be contained in the uppermost magnetic layer according to the present invention.

As a result of the study of the present inventors on the particle size of the above rare earth element-iron type magnetic powder, it has been found that the magnetic layer has good magnetic properties when an average particle size of the magnetic powder is 5 to 50 nm. With the conventional acicular magnetic powder, the lower limit of the average particle size in the major axis direction is about 100 nm to maintain the high coercive force. However, the magnetic powder of the present invention can be made very fine to have the average particle size of at least 5 nm, and such fine particles can exhibit good magnetic properties, since the coercive force is mainly based on the crystalline anisotropy. In particular, the average particle size is preferably at least 8 nm, more preferably at least 10 nm.

When the average particle size of the magnetic powder is too large, the filling properties of the magnetic powder in the magnetic layer deteriorate, and also the surface properties deteriorate when the magnetic layer is made thin. In addition, the particle noise due to the particle size increases when the magnetic recording medium is produced using such a magnetic powder having a large average particle size. Accordingly, the average particle size should be 50 nm or less and is preferably 40 nm or less, more preferably 30 nm or less. When the average particle size is adjusted in such a range, the very high filling properties are attained, and the excellent saturation magnetic flux density is achieved. The average particle size of 50 nm or less, in particular 30 nm or less is particularly important when the thickness of the magnetic layer is 0.09 µm or less.

Herein, the average particle size of the magnetic powder is obtained by measuring the particle sizes of 500 particles in the transmission electron microscopic (TEM) photograph taken at a magnification of 250,000 times and averaging the measured particle sizes, or by measuring the particle sizes of 300 particles in the transmission electron microscopic photograph taken at a magnification of 200,000 times and averaging the measured particle sizes. The former method is used unless otherwise indicated.

When the iron alloy is used as the iron component in the rare earth element-iron type magnetic powder of the present invention, examples of metals which form alloys with iron include magnetic transition metals such as Mn, Zn, Ni, Cu, Co, etc. Among them, Co and Ni are preferable. In particular, Co is preferable since it can increase also the saturation magnetization. The amount of the transition metal is preferably from 5 to 50 atomic %, more preferably from 10 to 30 atomic %, based on iron. In the case of the rare earth element-iron nitride magnetic powder, the amount of Co is preferably 10 atomic % or less.

The amount of the rare earth element constituting the rare earth element-iron-boron material is preferably from 0.2 to 20 atomic %, more preferably from 0.3 to 15 atomic %, particularly preferably from 0.5 to 10 atomic %, based on iron in the whole magnetic powder. The amount of the boron is from preferably 0.5 to 30 atomic %, more preferably from 1 to 25 atomic %, particularly preferably from 2 to 20 atomic %, based on iron in the whole magnetic powder. The atomic percentages of the rare earth element and boron are measured by the X-ray fluorescence analysis. When the above amounts of the rare earth metal and boron are contained in the material, the bonds of the atoms in the particles are enhanced by the magnetic interaction of a plurality of magnetic anisotropies, and thus the particles are united so that the coercive force of 80 to 400 kA/m, which is most suitable as the magnetic powder for the high performance magnetic recording media, can be achieved.

In the case of the rare earth element-iron magnetic powder, the amount of the rare earth element is preferably from 0.2 to 20 atomic %, more preferably from 0.5 to 15 atomic %, particularly preferably from 1.0 to 10 atomic %, based on iron in the whole magnetic powder.

In the case of the rare earth element-iron nitride magnetic powder, the amount of the rare earth element is preferably from 0.05 to 20 atomic %, more preferably from 0.2 to 20 atomic %, particularly preferably from 0.5 to 15 atomic %, most preferably from 1.0 to 10 atomic %, based on iron in the whole magnetic powder.

Now, the particle shape of the rare earth element-iron type magnetic powder is explained from the viewpoint of the dispersion of the powder in the magnetic paint and the properties required to form the thin magnetic layer.

In the case of the conventional acicular magnetic powders, the particle size is decreased to improve the recording properties such as the decrease of noise. As a result, the specific surface area of the particles inevitably increases. Thus, the interaction with the binder resin increases so that it becomes difficult to obtain a homogeneous dispersion when the magnetic powder is dispersed in the binder resin. Furthermore, when the magnetic paint dispersion is diluted with a large amount of an organic solvent to apply a thin layer, the magnetic powder particles tend to agglomerate, and therefore the orientation and surface properties deteriorate. Consequently, the particle size of the magnetic powder, which can be used in the production of the coating type magnetic recording media, is limited.

In contrast to the conventional magnetic powders, the rare earth element-iron type magnetic powder of the present invention has the particulate or acicular particle shape, and thus it can have a shape close to a sphere having the smallest specific surface area. Therefore, in comparison with the conventional magnetic powders, the magnetic powder of the present invention has a small interaction with the binder resin and can provide a magnetic paint with good flowability. If the magnetic powder particles are agglomerated, the redispersion of the particles is easy. Thus, the magnetic powder of the present invention can provide the magnetic paint which is particularly suitable for the formation of the thin magnetic layer. As a result, the magnetic powder having the average particle size of about 5 nm can be practically used.

The decrease of the thickness of the magnetic layer is effective to suppress the decrease of the output due to the writing and reading demagnetization, which is the essential problem of the longitudinal recording. Insofar as the acicular magnetic powder having the particle size in the major axis direction of about 100 nm is used, the thickness of the magnetic layer is limited, because the acicular particles are aligned in the plane direction of the magnetic recording medium on the average by the orientation in the magnetic field, but some particles may be aligned in the direction perpendicular to the plane of the medium since the orientation of the particles has distribution. When such particles are contained, they protrude from the surface of the magnetic layer and deteriorate the surface properties of the medium and may increase noise. Such problems become more serious as the thickness of the magnetic layer decreases. Thus, it is difficult to produce the coated film having a thickness of about 0.1 µm or less and also the smooth surface, insofar as the acicular magnetic powder is used.

When an undercoat layer is provided between the nonmagnetic support and the magnetic layer to reduce the thickness of the magnetic layer, and the undercoat layer is formed by the simultaneous multiple layer coating method in which the magnetic paint for the magnetic layer containing the dispersed acicular magnetic powder is coated over the undercoat layer while the undercoat layer is still wet, the magnetic powder is entrained by the undercoat layer so that the acicular magnetic powder particles tend to penetrate into the undercoat layer at the interface between the magnetic powder and the undercoat layer. Thus, the orientation of the magnetic powder particles is further disturbed, so that the desired squareness is not attained, and the surface smoothness of the magnetic layer deteriorates. Accordingly, the above problem may be one of the causes for a bar to the increase of the recording density by the thin layer coating when the acicular magnetic powder is used.

In contrast to the acicular magnetic powder, the rare earth element-iron type magnetic powder of the present invention has a small particle size and also the particulate or ellipsoidal particle shape and can have the particle shape close to the sphere. Therefore, the powder particles do not protrude from the surface of the magnetic layer. When the undercoat layer is provided, the penetration of the magnetic powder particles into the undercoat layer can be suppressed in contrast with the acicular magnetic powder. Accordingly, the magnetic layer having the extremely smooth surface can be formed.

As the thickness of the magnetic layer decreases, the magnetic flux from the magnetic layer decreases and thus the output decreases. Since the magnetic powder of the present invention has the particulate or ellipsoidal particle shape and can have the particle shape close to the sphere, it has an advantage such that the magnetic powder can be contained in the magnetic layer at a higher filling rate than the acicular magnetic powder and thus the high magnetic flux density can be easily attained.

Furthermore, with respect to the saturation magnetization, in general, the metal or metal alloy magnetic powders have the larger specific surface area as the particle size decreases, so that the ratio of the surface oxide layer which does not contribute to the saturation magnetization increases, while the magnet part contributing to the saturation magnetization decreases. That is, as the particle size decreases, the saturation magnetization decreases. This tendency is remarkable with the acicular magnetic powders, and the saturation magnetization suddenly decreases, when the major axis of the acicular particle is 100 nm or less. Such decrease of the saturation magnetization is taken into consideration, when the limit of the usable particle size is determined. Since the rare earth element-iron type magnetic powder of the present invention has the substantially spherical or ellipsoidal particle shape, the specific surface area is minimum among the particles having the same volume. Therefore, the magnetic powder of the present invention can maintain the high saturation magnetization in spite of the fine particle.

Figure 3:
FIG. 3 is a transmission type electron microphotograph of the particles of neodymium-iron magnetic powder prepared in Example 1 (magnification: 250,000).

In the present invention, the particle shape of the rare earth element-iron type magnetic powder is expressed by "substantially spherical or ellipsoidal". This intends to include any shape from the substantial sphere to the substantial ellipsoid including any intermediate shapes between the sphere and the ellipsoid. That is, the above expression is intended to exclude the "acicular" shape of the conventional magnetic powders. Among various shapes, a sphere having the smallest specific surface area or an ellipsoid are preferable. The particle shapes can be observed using the scanning electron microscope like the particle size. As already described, The term "substantially spherical of ellipsoidal" is intended to include "spherical" to "ellipsoidal" particles having uneven surfaces or slightly deformed particles as shown in the photographs of FIG. 3, etc.

As explained above, the rare earth element-iron type magnetic powder used in the present invention has the saturation magnetization, coercive force, particle size and particle shape, all of which are essentially suitable to form the thin magnetic layer, and particularly good recording-reproducing characteristics can be achieved, when the magnetic recording medium having the magnetic layer with an average thickness of 0.09 µm or less is produced using such a magnetic powder. Preferably, a saturation magnetization is 10 to 25 µWb/g (79.6 to 199.0 $Am^2/kg$), more preferably 10 to 20 µWb/g (79.6 to 159.2 $Am^2/kg$) to improve the characteristics in the high recording density range in the case of the magnetic recording medium having the magnetic layer with the average thickness of 0.09 µm or less.

Herein, the coercive force and saturation magnetization of the magnetic powder are values which are measured with a sample-vibration type magnetometer at 25° C. in an applied magnetic field of 1,273.3 kA/m and compensated using a standard sample.

In order to pack and disperse the ultrafine magnetic particles with an average particle size of 50 nm or less in a coating layer at a high density, it is preferable to prepare a paint by the following steps. Prior to the kneading step, the granular particles of magnetic powder are cracked with a cracking machine, and the cracked particles are mixed with an organic acid such as phosphoric acid, and a binder resin in a mixer, so as to treat the surfaces of the particles of the magnetic powder. In the kneading step, the treated mixture is kneaded in a continuous type twin screw kneader so that the solid content can be 80 to 85 wt. %, and that the ratio of the binder resin to the magnetic powder can be 17 to 30 wt. %. In the next step after the kneading step, the continuous twin screw kneader or other diluting machine is used to knead and dilute the knead-mixture with a binder resin solution and/or a solvent, at least one time, and the resultant paint is dispersed with a very fine media rotation type dispersing machine such as a sand mill.

Examples of the non-magnetic particles used in the primer layer include titanium oxide, iron oxide, aluminum oxide, etc., and iron oxide alone or a mixture of iron oxide and aluminum oxide is preferably used. In general, non-magnetic iron oxide having a major axis of 0.05 to 0.2 µm and a minor axis of 5 to 200 nm is mainly used, and if necessary, carbon black having a particle diameter of 0.01 to 0.1 µm, and aluminum oxide having a particle diameter of 0.1 to 0.5 µm are auxiliarily contained in the primer layer. The non-magnetic particles and the carbon black have not so sharp particle distributions, and this defect is not so serious when the thickness of the primer layer is 1.0 µm or more. However, when the thickness of the primer layer is 0.9 µm or less, the particles on the larger particle diameter side of the particle distribution influence the surface roughness of the primer layer. For this reason, it is difficult to form a thin primer layer with a thickness of 0.9 µm or less.

Accordingly, the present invention uses plate aluminum oxide particles having a number-average particle diameter of 10 nm to 100 nm as aluminum oxide suitable for the primer layer. The plate iron oxide particles only, or the mixture of the plate iron oxide particles and the plate aluminum oxide particles may be used.

The aluminum oxide plate particles with a particle size of 10 to 100 nm used in the present invention have two major features. One is that, because of being ultrafine plate particles, variation in the thickness of a coating layer with a thickness as thin as 0.9 µm or less is small, so that the smoothness of the surface does not degrade. The other is that a coating layer in which the plate particles are superposed on one another is formed, so that the coating layer is reinforced in the plane direction and is concurrently improved in dimensional stability against changes in temperature and humidity.

The product of the residual magnetic flux density and the thickness of a magnetic layer in the tape lengthwise direction is preferably 0.0018 to 0.05 µTm, more preferably 0.0036 to 0.05 µTm, further preferably 0.004 to 0.05 µTm. If this product is less than 0.0018 µTm, the reproducing output with a MR head is poor, while, if it exceeds 0.05 µTm, the reproducing output tends to skew. The use of a magnetic recording medium having such a magnetic layer advantageously makes it possible to shorten the recording wavelength, to increase the reproducing output with a MR head, to suppress the skew of the reproducing output and to increase the ratio of output to noises.

Next, the components constituting the magnetic recording medium of the present invention will be explained in detail.

<Substantially Spherical or Ellipsoidal Rare Earth Element-Iron Type Magnetic Powder>

Rare earth element-iron nitride magnetic powder containing An iron nitride phase in a core part A preferred embodiment of a substantially spherical or ellipsoidal rare earth element-iron magnetic powder containing the rare earth element mainly in the outer layer of magnetic powder particles, in which the core comprises the iron compound selected from $Fe_{16}N_2$ and $Fe_{16}N_2$ a part of iron atoms of which are replaced with other transition metal, will be explained.

The rare earth element-iron nitride magnetic powder of the present invention comprises substantially spherical or ellipsoidal magnetic powder particles in which the rare earth element is present mainly in the outer layer of the magnetic powder particles. Preferably, such a magnetic powder has an average particle size of 5 to 50 nm, more preferably 8 nm or more, particularly preferably 10 nm or more, and preferably of 40 nm or less, more preferably 30 nm or less. An average axis (an averaged ratio of a longer axis length (diameter) to a shorter axis length (diameter)) of 2 or less, particularly 1.5 or less. The content of the rare earth element is preferably from 0.05 to 20 atomic %, preferably 0.2 to 20 atomic %, based on the ion atoms in the magnetic powder. The content of nitrogen is preferably 1.0 to 20 atomic % based on the ion atoms in the magnetic powder. A BET specific surface area of the particles is preferably from 40 to 100 m$^2$/g.

The above rare earth element-iron nitride magnetic powder can be produced by supplying an oxide or hydroxide of iron as a raw material, coating the particles of the oxide or hydroxide of iron with the rare earth element, reducing them by heating, and then nitriding iron at a temperature lower than the reducing temperature.

In the rare earth element-iron nitride magnetic powder of the present invention, a content of the rare earth element is preferably from 0.05 to 20 atomic %, more preferably from 0.2 to 20 atomic %, particularly preferably from 0.5 to 15 atomic %, most preferably from 1.0 to 10 atomic %, based on the amount of iron. The content of nitrogen is preferably from 1.0 to 20 atomic %, more preferably from 1.0 to 12.5 atomic %, particularly preferably from 3 to 12.5 atomic %, based on the amount of iron.

When the content of the rare earth element is too small, the contribution of the rare earth element to the magnetic anisotropy decreases, and large magnetic powder particles tend to form because of sintering in the reducing process so that a particle size distribution may deteriorate. When the content of the rare earth element is too large, the amount of unreacted rare earth element, which does not contribute to the magnetic anisotropy, increases so that the magnetic properties, in particular, the saturation magnetization tend to excessively deteriorate.

When the content of nitrogen is too small, the amount of the $Fe_{16}N_2$ phase decreases so that the coercive force is not increased. When the content of the nitrogen is too large, iron nitrides having a smaller coercive force such as $Fe_4N$, $Fe_3N$, etc. and non-magnetic nitride tend to be formed so that the coercive force is not increased and further the saturation magnetization tends to excessively decrease.

The shape of the rare earth element-iron nitride magnetic powder of the present invention is substantial sphere or ellipsoid having an acicular ratio of 2 or less, in particular, a substantial sphere having an acicular ratio of 1.5 or less. The rare earth element-iron nitride magnetic powder of the present invention preferably has an average particle size of 5 to 50 nm, more preferably 8 nm or less, particularly preferably 10 nm or less, and preferably of 40 nm or less, more preferably 30 nm or less. When the particle size is too small, the dispersibility of the magnetic powder tends to deteriorate in the preparation of a magnetic paint. Furthermore, the magnetic powder may become thermally unstable, and the coercive force may change over time. When the particle size is too large, it may increase the noise and also the magnetic layer may not have a smooth surface.

The particle size of the rare earth element-iron nitride magnetic powder is determined by measuring the particle sizes of 300 particles in the transmission electron microscopic photograph taken at a magnification of 200,000 times and averaging the measured particle sizes.

The saturation magnetization of the rare earth element-iron nitride magnetic powder of the present invention is preferably 80 to 160 Am$^2$/kg (80 to 160 emu/g or 10 to 20 µWb/g), more preferably 90 to 155 Am$^2$/kg (90 to 155 emu/g or 11.3 to 19.5 µWb/g), particularly preferably 100 to 145 Am$^2$/kg (100 to 145 emu/g or 12.6 to 18.2 µWb/g). A coercive force is preferably 80 to 400 kA/m (1005 to 5024 Oe), more preferably at least 119.4 kA/m (1500 Oe), more preferably at least 159.2 kA/m (2000 Oe), particularly preferably at least 100 kA/m (2261 Oe), most preferably at least 200 kA/m, (2512 Oe) while it is preferably 318.5 kA/m (4000 Oe) or less, more preferably 278.6 kA/m (3500 Oe) or less.

The rare earth element-iron magnetic powder of the present invention preferably has a BET specific surface area of 40 to 100 m$^2$/g. When the BET specific surface area is too small, the particle size becomes too large so that the magnetic recording medium comprising such a magnetic powder tend to have a high particle noise and the surface smoothness of the magnetic layer decreases so that the reproducing output tends to decrease. When the BET specific surface area is too large, it is difficult to prepare a uniformly dispersed magnetic paint due to the agglomeration of the magnetic powder particles. When such a magnetic powder is used to produce a magnetic recording medium, the orientation may decrease or the surface smoothness may deteriorate.

As described above, the rare earth element-iron nitride magnetic powder of the present invention has the excellent properties as the magnetic powder for magnetic recording media. In addition, this magnetic powder has good storage stability. Thus, when this magnetic powder or magnetic recording media comprising this magnetic powder is stored under high-temperature high-humidity conditions, it does not suffer from the deterioration of the magnetic properties. Therefore, this magnetic powder is suitable for use in magnetic recording media for high density recording.

Any reason why the above effects are achieved has not been clarified, but it may be assumed that since the high magnetic anisotropy of the $Fe_{16}N_2$ phase is associated with the magnetic anisotropy of the compound comprising the rare earth element, the rare earth element-iron nitride magnetic powder has the specific properties which are not found in the conventional magnetic powders. In particular, when the rare earth element is primarily present in the outer layer part (surface) of the magnetic powder particles, the specific properties of the rare earth element-iron nitride magnetic powder may be based on various factors such that the high coercive force can easily be achieved by the surface magnetic anisotropy and that the particle size distribution becomes narrow due to the shape-maintaining effect of the magnetic powder in the reduction step.

In the case of the rare earth element-iron nitride magnetic powder, the presence of the rare earth element inside the magnetic powder particles is not excluded. In such a case, the magnetic powder particles have a multi-layer structure having an inner layer and an outer layer, and the rare earth element is primarily present in the outer layer near the surface of the particle. When the magnetic powder has such a structure, the iron phase of the inner layer (core part) usually comprises the $Fe_{16}N_2$ phase. However, it is not necessary for the inner layer to consist of the $Fe_{16}N_2$ phase, but the inner layer may comprise a mixture of the $Fe_{16}N_2$ phase and an α-Fe phase. The latter is sometimes advantageous since a desired coercive force can be easily achieved by adjusting the ratio of the $Fe_{16}N_2$ phase to the α-Fe phase.

As described above, the rare earth element may be yttrium, ytterbium, cesium, praseodymium, lanthanum, samarium, europium, neodymium, terbium, etc. Among them, yttrium, samarium or neodymium can greatly increase the coercive force and effectively serves to the maintenance of the particle shape in the reducing step. Thus at least one of yttrium, samarium and neodymium is preferably used.

Together with such a rare earth element, other element such as phosphorus, silicon, aluminum, carbon, calcium, magnesium, etc. may be contained in the magnetic powder. When at least one of silicon and aluminum, which effectively prevent sintering, is used in combination with the rare earth element, a high coercive force is attained.

As described above, the rare earth element-iron nitride magnetic powder may be produced using an oxide or hydroxide of iron such as hematite, magnetite, goethite, etc., as a raw material. The average particle size of the raw material is selected by taking into consideration the volume change of the particle in the reducing and nitriding steps, and usually from about 5 to 100 nm.

The rare earth element is adhered or deposited on the surface of the raw material particles. Usually, the raw material is dispersed in an aqueous solution of an alkali or an acid. Then, the salt of the rare earth element is dissolved in the solution and the hydroxide or hydrate of the rare earth element is precipitated and deposited on the raw material particles by a neutralization reaction, etc.

The amount of the rare earth element is usually from 0.05 to 20 atomic %, preferably from 0.2 to 20 atomic %, more preferably from 0.5 to 15 atomic %, particularly preferably from 1.0 to 10 atomic %, based on the iron atoms in the magnetic powder.

In addition to the rare earth element, a compound of silicon or aluminum which prevents the sintering of the particles is dissolved in a solvent and the raw material is dipped in the solution so that such an element can be deposited on the raw material particles together with the rare earth element. To effectively carry out the deposition of such an element, an additive such as a reducing agent, a pH-buffer, a particle size-controlling agent, etc. may be mixed in the solution. Silicon or aluminum may be deposited at the same time as or after the deposition of the rare earth element.

Then, the raw material particles on which the rare earth element and optionally other element are deposited are reduced by heating them in the atmosphere of a reducing gas. The kind of the reducing gas is not limited. Usually a hydrogen gas is used, but other reducing gas such as carbon monoxide may be used.

A reducing temperature is preferably from 300 to 600° C. When the reducing temperature is less than 300° C., the reducing reaction may not sufficiently proceed. When the reducing temperature exceeds 600° C., the particles tend to be sintered.

After the reduction of the particles, they are subjected to the nitriding treatment. Thereby, the rare earth element-iron nitride magnetic powder of the present invention is obtained. The nitriding treatment is preferably carried out with a gas containing ammonia. Apart from pure ammonia gas, a mixture of ammonia and a carrier gas (e.g. hydrogen gas, helium gas, nitrogen gas, argon gas, etc.) may be used. The nitrogen gas is preferable since it is inexpensive.

The nitriding temperature is preferably from about 100 to 300° C. When the nitriding temperature is too low, the particles are not sufficiently nitrided so that the coercive force may insufficiently be increased. When the nitriding temperature is too high, the particles are excessively nitrided so that the proportion of $Fe_4N$ and $Fe_3N$ phases increases and thus the coercive force may rather be decreased and the saturation magnetization tends to excessively decrease.

The nitriding conditions are selected so that the content of the nitrogen atoms is usually from 1.0 to 20 atomic %, preferably from 1.0 to 12.5 atomic %, more preferably from 3 to 12.5 atomic %, based on the amount of iron in the rare earth element-iron nitride magnetic powder obtained.

Rare Earth Element-Iron-Boron Magnetic Powder Containing Metal Iron or an Iron Alloy in a Core Part The rare earth element-iron-boron magnetic powder to be used in the present invention may be prepared by the following method:

Firstly, an aqueous solution containing the rare earth element ion such as neodymium, samarium, etc., the iron ion and optionally a transition metal ion such as Mn, Zn, Ni, Cu, Co, etc., and an aqueous solution of an alkali are mixed to form the coprecipitate of the rare earth element, iron and the optional transition metal. As the sources of the rare earth element ion, iron ion and transition metal ion, iron sulfate, iron nitrate and the like are used.

Next, a boron compound is mixed with the coprecipitate, and the mixture is heated at a temperature of 60 to 400° C. to obtain the oxide of the rare earth metal, iron and optionally the transition metal containing boron.

The boron compound serves as the source of boron and also functions as a flux which facilitates the crystal growth to the desired particle size while preventing the excessive sintering of the particles. The king of the boron compound is not limited. Preferably, $H_3BO_3$, $BO_2$, etc. are used.

Although the boron compound in the solid state may be mixed with the coprecipitate, the boron compound is dissolved in the aqueous suspension of the coprecipitate, the suspension is dried to remove water, and then the residue is heated so that the coprecipitate and boron are homogeneously mixed. Thereby, the magnetic powder having the better properties can be obtained.

The heated mixture is washed with water to remove the excessive boron, dried and then reduced by heating in a reducing atmosphere such as hydrogen gas at a temperature of 400 to 800° C. to obtain the rare earth element-iron-boron magnetic powder.

The magnetic powder of the present invention may contain other element to improve, for example, corrosion resistance. In this case, the amounts of the rare earth element and boron in the whole magnetic powder are preferably from 0.2 to 20 atomic % and from 0.5 to 30 atomic %, respectively, based on iron.

Alternatively, the rare earth element-iron-boron magnetic powder of the present invention may be produced as follows:

An aqueous solution containing the iron ion and optionally the transition metal ion such as Mn, Zn, Ni, Cu, Co, etc. and an aqueous solution of an alkali are mixed to form a precipitate of iron and the optional transition metal. Also in this method, iron sulfate, iron nitrate and the like are used as the sources of the iron ion and transition metal ion. Then, the salt of the rare earth element such as neodymium, samarium, etc. and the boron compound are mixed with the precipitate, and the mixture is heated at a temperature of 60 to 400° C. to obtain the oxide of the rare earth metal, iron and optionally the transition metal containing boron.

Next, excessive boron is removed, and the oxide is heated and reduced in the hydrogen gas like the above-described method to obtain the rare earth element-iron-boron magnetic powder.

The latter method is suitable to obtain the rare earth element-iron-boron magnetic powder having a structure comprising a core part mainly formed of metal iron or the iron alloy with the transition metal and an outer part mainly formed of the rare earth element-iron-boron material. Also in this method, the magnetic powder of the present invention may contain other element to improve, for example, corrosion resistance. Again, the amounts of the rare earth element and boron in the whole magnetic powder are preferable from 0.2 to 20 atomic % and from 0.5 to 30 atomic %, respectively, based on iron.

Rare Earth Element-Iron Magnetic Powder Containing Metal Iron or an Iron Alloy in a Core Part A rare earth element-iron magnetic powder containing metal iron or an iron alloy in a core part can be prepared as follows:

The spherical or ellipsoidal particles of magnetite or cobalt ferrite are dispersed in an aqueous solution containing at least the ions of a rare earth element. Then, a solution of an alkali in a sufficient amount for converting the rare earth element ions to a hydroxide is added to the dispersion to form a layer of the hydroxide of the rare earth element on the magnetite or cobalt ferrite particles. Thereafter, the particles are recovered by filtration, dried and reduced by heating to obtain the desired magnetic powder. The kind of the spherical or ellipsoidal particles such as the magnetite or cobalt ferrite particles is not limited. For example, magnetite particles having a desired particle size can be prepared by adding an alkali to an aqueous solution of iron(II) ion dissolved therein to form iron(II) hydroxide and heating this hydroxide at a suitable temperature and pH. Cobalt ferrite particles having a desired particle size can be prepared by adding an alkali to an aqueous solution of cobalt(II) ion and iron(III) ion to form the hydroxide of cobalt(II) and iron (III), and heating this hydroxide at a suitable temperature and pH.

The hydroxide of the rare earth element is formed in the surface layer of magnetite or cobalt ferrite particles, and the particles are recovered by filtration, dried and then reduced by heating usually at a temperature of 400 to 800° C. The conditions of this heating for reduction are not limited. When the particles are heated in a reducing atmosphere at a suitable temperature, the desired magnetic powder is obtained. When the obtained magnetic powder is subjected to stabilization treatments, the magnetic powder has good reliability when it is used in the magnetic recording medium. In the case of the rare earth element-iron magnetic powder containing metal iron or the iron alloy mainly in the core part, the rare earth element is primarily present in the outer layer of the magnetic powder particles.

<Non-Magnetic Plate Particles>

The non-magnetic plate particles and a method for producing the same will be explained in detail by making reference to plate alumina by way of example.

Fine aluminum oxide particles having a particle diameter of 100 nm or less, good crystallinity and a narrow particle size distribution have been required, but any aluminum oxide particles which satisfy those properties have not been developed.

The present inventors now newly developed plate particles (fine particles) of aluminum oxide, etc., which satisfy the above properties. The inventors thought that if such plate particles were used in the primer layer of a magnetic tape, it would be possible to decrease the fluctuation of the thickness of the thinly coated primer layer, to improve the surface smoothness and the strength in the plane direction of the layer, and to increase the dimensional stability against the change of temperature and humidity.

Here, a method for producing newly developed plate particles, as mentioned above, will be described by making reference to aluminum oxide particles as an example.

To obtain aluminum oxide particles suitable for a primer layer, in the first step, an aqueous solution of aluminum salt is added to an aqueous alkaline solution, and the resultant hydroxide or hydrate of aluminum is subjected to a hydrothermal treatment by heating it at a temperature of 110 to 300° C. in the presence of water, so as to regulate the resultant particles to an intended shape and an intended particle diameter.

The problem of this step rests in the peculiar property of the hydroxide or hydrate of aluminum that the hydroxide or hydrate of aluminum can be dissolved both in an alkaline solution and an acidic solution, and forms its precipitate only at or around neutral pH. However, to obtain particles of a hydroxide or a hydrate of aluminum having an intended shape and an intended particle diameter through a hydrothermal reaction, it is needed to use an alkaline solution. The present inventors have intensively studied in order to overcome the problem of the peculiar property of the hydroxide or hydrate of aluminum which has a trade-off relationship. As a result, they have discovered that the intended reaction can proceed only at or around pH 10.

Next, in the second step, the above hydroxide or hydrate of aluminum is heated in an air. By doing so, there can be obtained aluminum oxide particles with good crystallinity which show an uniform particle diameter distribution and which is hardly sintered or agglomerated.

Thus, quite a novel conception for the production of aluminum oxide particles which comprises separate steps is provided: that is, a step for regulating the shape and particle diameter of the particles is carried out separately from a step for fully extracting the inherent physical properties of a material. Based on this novel conception, the present inventors have succeeded in the development of aluminum oxide plate particles with an average particle diameter of 10 to 100 nm which any of the conventional processes has never achieved. The term "plate-shaped" referred to herein means a shape having a plate ratio (the maximal diameter/the thickness) of exceeding 1. Preferably, this plate ratio is more than 2 and up to 100, more preferably 3 to 50, further preferably 5 to 30. If the plate ratio is 2 or less, some of the particles are raised from the surface of a coating layer and may damage heads or guides, in case of using a primer layer, while, if it exceeds 100, some of the particles are crushed during the preparation of a paint by using the same.

This novel process comprising the separate steps as mentioned above can be applied not only to aluminum oxide particles but also to the particles of oxides or compounded oxides of rare earth elements such as cerium, elements such as zirconium, silicon, titanium, manganese, iron and the like, or their mixed crystals, which have a particle diameter (number-average particle diameter) of 5 to 100 nm.

<Non-Magnetic Support>

The thickness of a non-magnetic support is generally 2 to 5 µm, preferably 2 to 4.5 µm, more preferably 2 to 4 µm, which may vary in accordance with an end use. When the thickness of the non-magnetic support is less than 2 µm, it is difficult to form a film, and the strength of the resultant magnetic tape tends to lower. When the thickness of the non-magnetic support exceeds 4.5 µm, the total thickness of the magnetic tape increases to 6 µm or more so that the recording capacity per reel decreases.

The Young's modulus of the non-magnetic support in the lengthwise direction is preferably at least 9.8 GPa (1,000 kg/mm$^2$), more preferably at least 10.8 GPa (1,100 kg/mm$^2$). When the Young's modulus of the support is less than 9.8 GPa (1,000 kg/mm$^2$), the travelling feeding of the magnetic tape may become unstable. In case of a helical scan type magnetic tape, the ratio of the Young's modulus in the lengthwise direction (MD) to the Young's modulus in the widthwise direction (TD) is preferably 0.60 to 0.80, more preferably 0.65 to 0.75. When this ratio is less than 0.60 or when it exceeds 0.80, fluctuation in output from the region between the entrance to a track for a magnetic head and the exit from the track therefor (flatness) becomes larger, although any mechanism for this has not been clarified. The flatness becomes minimal when the MD/TD ratio is at or around 0.70. Further, in case of a linear recording type magnetic tape, the ratio of the Young's modulus in the lengthwise direction to the Young's modulus in the widthwise direction is preferably 0.70 to 1.30, although any reason therefor has not been known. Examples of a non-magnetic support satisfying the above requirements are a biaxial oriented film of aromatic polyamide, aromatic polyimide, and the like.

<Primer Layer>

The thickness of a primer layer is preferably 0.3 to 0.9 μm. When the thickness of the primer layer is less than 0.3 μm, the effect of reducing a variation in the thickness of a magnetic layer and the effect of improving the durability of the magnetic layer are poor. When the thickness of the primer layer exceeds 0.9 μm, the total thickness of a magnetic tape is too thick, so that the recording capacity per one reel of the magnetic tape decreases.

The primer layer preferably contains the above plate particles with a particle diameter of 10 to 100 nm so as to ensure the uniformity in the thickness of the layer and the surface smoothness, and to control the stiffness and the dimensional stability of the tape.

The components of the non-magnetic particles are oxides or compounded oxides of rare earth elements such as cerium, elements such as zirconium, silicon, titanium, manganese and iron, in addition to aluminum oxide. To improve the conductivity, plate-shaped ITO particles (indium tin oxide) may be added. The plate-shaped ITO particles may be added in an amount of 15 to 95 wt. % based on the weight of all the inorganic powder in the primer layer. If needed, carbon black may be added to improve the conductivity, and carbon black with a particle diameter of 10 to 100 nm is preferable. Further, conventional oxide particles of iron oxide, aluminum oxide and the like may be added. In this case, it is preferable to use particles as fine as possible. A binder resin used in the primer layer may be the same one as used in the magnetic layer.

<Lubricant>

Preferably, the primer layer contains 0.5 to 5.0 wt. % of a higher fatty acid and O2 to 3.0 wt. % of a higher fatty acid ester based on the total weight of the powder components in the magnetic layer and the primer layer, because the coefficient of friction of the magnetic tape against a head can be decreased. When the amount of the higher fatty acid is less than 0.5 wt. %, the effect to decrease the coefficient of friction is insufficient. When the amount of the higher fatty acid exceeds 5.0 wt. %, the primer layer may be plasticized and thus the toughness of the primer layer may be lost. When the amount of the higher fatty acid ester is less than 0.2 wt. %, the effect to decrease the coefficient of friction is insufficient. When the amount of the higher fatty acid ester exceeds 3.0 wt. %, the amount of the higher fatty acid ester which migrates to the magnetic layer becomes too large, so that the magnetic tape may stick to the head.

It is preferable to use a fatty acid having 10 or more carbon atoms. Such a fatty acid may be a linear or branched fatty acid, or an isomer thereof such as a cis form or trans form. However, a linear fatty acid is preferable because of its excellent luburicity. Examples of such a fatty acid include lauric acid, myristic acid, stearic acid, palmitic acid, behenic acid, oleic acid, linoleic acid, etc., among which myristic acid, stearic acid and palmitic acid are preferable. The amount of the fatty acid to be added to the magnetic layer is not particularly limited, since the fatty acid migrates between the primer layer and the magnetic layer. Thus, the sum of the fatty acids added to the magnetic layer and the primer layer is adjusted to the above-specified amount. When the fatty acid is added to the primer layer, the magnetic layer may not always contain the fatty acid.

The coefficient of friction of the travelling magnetic tape can be decreased, when the magnetic layer contains 0.5 to 3.0 wt. % of a fatty acid amide and 0.2 to 3.0 wt. % of a higher fatty acid ester, based on the weight of the magnetic powder. When the amount of the fatty acid amide is less than 0.5 wt %, the direct contact of the head and the magnetic layer at their interface tends to occur, and the sintering-preventive effect is poor. When the amount of the fatty acid amide exceeds 3.0 wt %, the fatty acid amide may bleed out and causes a defect such as dropout.

As the fatty acid amide, the amides of palmitic acid, stearic acid and the like can be used.

The intermigration of the lubricant between the magnetic layer and the primer layer is not always inhibited <Magnetic Layer>

As a binder resin to be contained in the magnetic layer (or the primer layer) (hereinafter simply referred to as "binder"), the following can be used: a combination of a polyurethane resin with at least one resin selected from the group consisting of a vinyl chloride resin, a vinyl chloride-vinyl acetate copolymer, a vinyl chloride-vinyl alcohol copolymer (which may sometimes referred to as "copolymer"), a vinyl chloride-vinyl acetate-vinyl alcohol copolymer, a vinyl chloride-vinyl acetate-maleic anhydride copolymer, a vinyl chloride-hydroxyl group-containing alkyl acrylate copolymer, and cellulose resins such as nitrocellulose. Among them, a combination of a vinyl chloride-hydroxyl group-containing alkyl acrylate copolymer resin with a polyurethane resin is preferably used. Examples of the polyurethane resin include polyesterpolyurethane, polyetherpolyurethane, polyetherpolyesterpolyurethane, polycarbonatepolyurethane, polyesterpolycarbonatepolyurethane, etc.

Preferably, a binder such as a urethane resin which is a polymer having, as a functional group, —COOH, —SO$_3$M, —OSO$_3$M, —P=O(OM)$_3$, —O—P=O(OM)$_2$ [wherein M is a hydrogen atom, an alkali metal base or an amine salt], —OH, —NR$^1$R$^2$, —N$^+$R$^3$R$^4$R$^5$ [wherein R$^1$, R$^2$, R$^3$, R$^4$ and R$^5_4$ are, each independently the same or different, a hydrogen atom or a hydrocarbon group], or an epoxy group is used. The reason why such a binder is used is that the dispersibility of the magnetic powder, etc. is improved as mentioned above. When two or more resins are used in combination, it is preferable that the polarities of the functional groups of the resins are the same. In particular, the combination of resins both having —SO$_3$M groups is preferable.

Each of these binders is used in an amount of 7 to 50 parts by weight, preferably from 10 to 35 parts by weight, based on 100 parts by weight of the magnetic powder. In particular, the best combination as the binder is 5 to 30 parts by weight of a vinyl chloride-based resin and 2 to 20 parts by weight of a polyurethane resin.

It is preferable to use the binder in combination with a thermally curable crosslinking agent which bonds with the functional groups in the binder to crosslink the same. Preferable examples of the crosslinking agent include isocyanates such as tolylene diisocyanate, hexamethylene diisocyanate, and isophorone diisocyanate; and polyisocyanates such as reaction products of these isocyanates with compounds each having a plurality of hydroxyl groups such as trimethylolpropane, and condensation products of these isocyanates. The crosslinking agent is used usually in an amount of 1 to 30 parts by weight, preferably 5 to 20 parts by weight, based on 100 parts by weight of the binder. When the magnetic layer is applied on the primer layer by the wet on wet method, some of polyisocyanate is diffused and fed from a paint for the primer layer. Therefore, the magnetic layer can be crosslinked to some degree, even if polyisocyanate is not used in combination.

The magnetic layer may contain the above-mentioned plate particles with a particle diameter of 10 to 100 nm. If needed, the magnetic layer may contain a conventional abrasive. Examples of such an abrasive include α-alumina, β-alumina, silicon carbonate, chrome oxide, cerium oxide, α-iron oxide, corundum, artificial diamond, silicon nitride, silicon carbonate, titanium carbide, titanium oxide, silicon dioxide, boron nitride, and the like. Each of these abrasives with Moh's hardness of 6 or more is used alone or in combination. In case of a thin magnetic layer with a thickness of 0.01 to 0.09 μm, the particle diameter (number-average particle diameter) of abrasive is preferably 10 to 150 nm. The amount of abrasive to be added is preferably 5 to 20 wt. %, more preferably 8 to 18 wt. % based on the weight of the magnetic powder.

The magnetic layer may further contain plate-shaped ITO particles which are prepared by the above-described method, and conventional carbon black (CB) in order to improve the conductivity and the surface lubricity. Examples of such carbon black include acetylene black, furnace black, thermal black and the like. The particle diameter thereof is preferably 10 to 100 nm. If the particle diameter is 10 nm or less, it becomes hard to disperse carbon black. If it is 100 nm or more, it is needed to add a large amount of carbon black. In either case, the surface of the magnetic layer becomes coarse, which leads to a decrease in output. The amount of carbon black to be added is preferably 0.2 to 5 wt. %, more preferably 0.5 to 4 wt. %, based on the weight of the magnetic powder <Backcoat Layer>

A backcoat layer, which is one example of the back layer, is explained.

To improve the tape-running performance, a backcoat layer may be formed on the other side of the above non-magnetic support composing the magnetic recording medium of the present invention (the side opposite to the side of the non-magnetic support on which the magnetic layer is formed). The thickness of the backcoat layer is preferably from 0.2 to 0.8 μm, more preferably 0.5 μm or less. When the thickness of the backcoat layer is less than 0.2 μm, the effect to improve the tape-running performance is insufficient. When the thickness of the backcoat layer exceeds 0.8 μm, the total thickness of the magnetic tape increases, so that the recording capacity per one reel of the tape decreases.

As carbon black (CB) to be contained in the backcoat layer, acetylene black, furnace black, thermal black or the like can be used. In general, carbon black with a small particle diameter and carbon black with a large particle diameter are used in combination. The particle diameter (number-average particle diameter) of small particle diameter carbon black is from 5 to 200 nm, preferably from 10 to 100 nm. When the particle diameter of small particle diameter carbon black is less than 10 nm, the dispersion thereof is difficult. When the particle diameter of small particle diameter carbon black exceeds 100 nm, a large amount of carbon black should be added. In either case, the surface of the backcoat layer becomes coarse and thus the surface roughness of the backcoat layer may be transferred to the reverse side of the magnetic layer (embossing).

When the large particle diameter carbon black having a particle diameter of 300 to 400 nm is used in an amount of 5 to 15 wt. % based on the weight of the small particle diameter carbon black, the surface of the backcoat is not roughened and the effect to improve the tape-running performance is increased. The total amount of the small particle diameter carbon black and the large particle diameter carbon black is preferably from 60 to 98 wt. %, more preferably from 70 to 95 wt. %, based on the weight of the inorganic powder in the backcoat layer. The average height Ra of the surface roughness of the backcoat layer is preferably from 3 to 8 nm, more preferably from 4 to 7 nm.

Further, the above plate particles having a particle diameter (number-average particle diameter) of 10 to 100 nm may be added to the backcoat layer in order to improve the strength. The components of the plate particle include not only aluminum oxide but also oxides or compounded oxides of rare earth elements such as cerium, and elements such as zirconium, silicon, titanium, manganese, iron and the like. Further, the ITO plate particles (indium tin oxide) prepared by the above method may be added to the backcoat layer in order to improve the conductivity of the magnetic tape. The plate ITO particles and the carbon black particles are added to the backcoat layer in a total amount of 60 to 98 wt. % based on the weight of all the inorganic powder in the backcoat layer. The particle diameter of the carbon black particles is preferably 10 to 100 nm. If needed, iron oxide particles with a particle diameter of 0.1 to 0.6 μm may be added in an amount of 2 to 40 wt. %, preferably 5 to 30 wt. % based on the weight of all the inorganic powder in the backcoat layer.

As a binder resin to be contained in the backcoat layer, the same resins as the binder resins used in the magnetic layer and the primer layer can be used. Among those, the combination of a cellulose resin with a polyurethane resin is preferably used so as to decrease the coefficient of friction and to improve the tape-running performance.

The amount of the binder resin in the backcoat layer is usually from 40 to 150 parts by weight, preferably from 50 to 120 parts by weight, more preferably from 60 to 110 parts by weight, still more preferably from 70 to 110 parts by weight, based on 100 parts by weight of the total of the carbon black and the inorganic non-magnetic powder in the backcoat layer. When the amount of the binder resin is less than 50 parts by weight, the strength of the backcoat layer is insufficient. When the amount of the binder resin exceeds 120 parts by weight, the coefficient of friction tends to increase. Preferably, 30 to 70 parts by weight of a cellulose resin and 20 to 50 parts by weight of a polyurethane resin are used in combination. To cure the binder resin, a crosslinking agent such as a polyisocyanate compound is preferably used.

The crosslinking agent to be contained in the backcoat layer may be the same as those used in the magnetic layer and the primer layer. The amount of the crosslinking agent is usually from 10 to 50 parts by weight, preferably from 10 to 35 parts by weight, more preferably from 10 to 30 parts by weight, based on 100 parts by weight of the binder resin. When the amount of the crosslinking agent is less than 10 parts by weight, the film strength of the backcoat layer tends to decrease. When the amount of the crosslinking agent exceeds 35 parts by weight, the coefficient of dynamic friction of the backcoat layer against SUS increases.

<Organic Solvent>

Examples of organic solvents to be used in the paints for the magnetic layer, the primer layer and the backcoat layer include ketone solvents such as methyl ethyl ketone, cyclohexanone, methylisobutylketone, etc.; ether solvents such as tetrahydrofuran, dioxane, etc.; and acetate solvents such as ethyl acetate, butyl acetate, etc. Each of these solvents may be used alone or in combination, and such a solvent may be further mixed with toluene for use.

<Magnetic Tape (Recording) Cartridge>

A magnetic tape cartridge comprising the magnetic tape of the present invention is explained.

Figure 2:
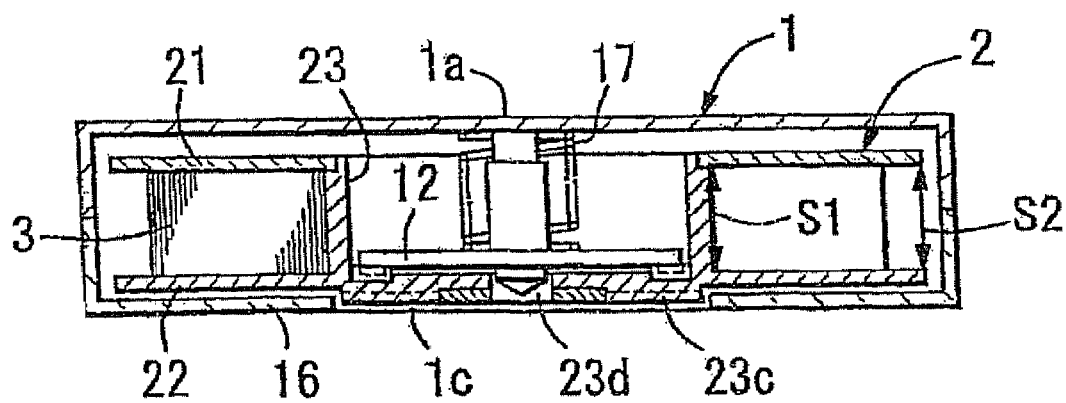
FIG. 2 is a cross sectional view of the magnetic tape cartridge of FIG. 1.

FIG. 1 shows a general structure of a magnetic tape cartridge, and FIG. 2 shows the inside structure of the cartridge of FIG. 1.

As shown in FIG. 1, this computer tape comprises a box-shaped casing body (1) constructed by joining an upper casing section (1a) to a lower casing section (1b), and one reel (2) having the magnetic tape (3) wound thereon and arranged in the casing body (1). An outlet (4) for drawing out the magnetic tape from the cartridge is formed at one side of the front wall (6) of the casing body (1), and the outlet (4) is opened or closed by a slidable door (5). A tape-drawing member (7) is connected to an end portion for drawing out the magnetic tape (3) so as to draw out the magnetic tape (3) wound on the reel (2) from the casing for operation. Numeral 20 in FIG. 1 refers to a door spring for forcing the door (5) to freely close the outlet.

In FIG. 2, the reel 2 comprises the upper flange (21), the lower flange (22), and the cylindrical winding shaft (23) having a bottom and opening upwardly, which is integrally formed with the lower flange (22). The bottom wall (23c) of winding shaft (23) is positioned over the driving shaft-insertion inlet (1c). The gear teeth, which engage with a member of a tape-driving apparatus (a magnetic recording-reproducing apparatus), are formed on the periphery of the bottom wall (23c) of the winding shaft (23), while the bottom hole (23d), which allows the insertion of an unlocking pin (not shown) of the tape-driving apparatus, is formed at the center of the bottom wall (23c) of the winding shaft (23). In the casing body (1), there is provided a reel locking mechanism, which prevents casual rotation of the reel (2) when the cartridge is not used. In FIG. 2, numeral 12 refers to the braking button constituting the reel locking mechanism, and numeral 17 refers to the spring which forces the locking button (12) downwardly in the figure.

EXAMPLES

The present invention will be explained in detail by way of the following Examples, which do not limit the scope of the present invention in any way. In Examples and Comparative Examples, "parts" are "parts by weight"

Example 1

Synthesis of Ultrafine Magnetic Particles:

Iron nitrate (III) (0.074 mol) and neodymium nitrate (0.002 mol) were dissolved in water (600 cc). Separately from this aqueous solution of nitrates, sodium hydroxide (0.222 mol) was dissolved in water (600 cc). To this aqueous sodium hydroxide solution, was added the aqueous nitrate solution, and the mixture was stirred for 5 minutes to form a hydroxide (co-precipitate) of iron and neodymium. The hydroxide was washed with water and filtered to collect the hydroxide. To this hydroxide (containing water), were further added water (30 cc) and boric acid ($H_3BO_3$) (0.5 mol) and the mixture was heated at 60° C. in an aqueous boric acid solution, while the hydroxide of iron and neodymium was being again dispersed. The resultant dispersion was spread onto a vat and dried at 60° C. for 4 hours to evaporate off water. Thus, a homogenous mixture of the hydroxide of iron and neodymium and boric acid was prepared.

This mixture was crushed and put into an alumina crucible. The mixture was treated by heating at 200° C. in an air for 4 hours to obtain a neodymium-iron oxide to which boron was bonded. In this reaction, boric acid acts as a source for supplying boron and also as a flux for growing crystals to an intended particle size while preventing the excessive sintering of the particles. The resultant product was washed with water to remove excessive boron. Thus, particles of neodymium-iron oxide to which boron was bonded were obtained. The oxide particles were reduced by heating at 450° C. in a hydrogen stream for 4 hours to obtain neodymium-iron-boron type magnetic powder. The resultant magnetic powder was then cooled to room temperature in the stream of a hydrogen gas, and again heated to 60° C. under an atmosphere of a mixed gas of nitrogen and oxygen, and treated for stabilization under the atmosphere of a mixed gas of nitrogen and oxygen for 8 hours, and finally exposed to an air for use.

With the resultant neodymium-iron-boron magnetic powder, the content of neodymium to iron was 2.4 atomic %, and the content of boron to iron was 9.1 atomic %, according to a fluorescent X-ray analysis FIG. 3 shows the transmission electron microphotograph of this neodymium-iron-boron magnetic powder (magnification: 250,000). As can be seen from this photograph, the powder comprised substantially spherical or ellipsoidal particles with a particle diameter of 25 μm (axis ratio: 1.2). The saturation magnetization of the magnetic powder under the application of a magnetic field of 1,273.3 kA/m was found to be 132 $A \cdot m^2/kg$ (132.0 emu/g), and the coercive force thereof, 191.8 kA/m (2,410 Oe).

Synthesis of Plate Alumina Particles:

Sodium hydroxide (0.075 mol) was dissolved in water (90 ml) to prepare an aqueous alkaline solution. Separately from this alkaline solution, an aqueous aluminum chloride solution was prepared by dissolving aluminum chloride (III) heptahydrate (0.0074 mol) in water (40 ml). To the aqueous alkaline solution, was added dropwise the aqueous aluminum chloride solution to form a precipitate containing aluminum hydroxide. To the precipitate, was added dropwise hydrochloric acid so as to adjust the pH to 10.2, A suspension of the precipitate was aged for 20 hours, and then washed with water in an amount about 1,000 times larger than the amount of the precipitate.

Next, the supernatant was removed, and the pH of the residual suspension of the precipitate was adjusted to 10.0 with an aqueous sodium hydroxide solution. The suspension was charged in an autoclave and subjected to a hydrothermal treatment at 200° C. for 2 hours.

The resultant product was filtered and dried at 90° C. in an air. The dried product was slightly crushed in a mortar and treated by heating at 600° C. in an air for one hour. Thus, aluminum oxide particles were obtained. After the heat treatment, the aluminum oxide particles were washed with water, using an ultrasonic dispersing machine, so as to remove the non-reacted product and residues. Then, the particles were filtered and dried.

The resultant aluminum oxide particles were subjected to an X-ray diffraction analysis. As a result, a spectrum corresponding to γ-alumina was observed. Further, the shapes of the particles were observed with a transmission electron microscope. As a result, they were found to be square plate particles having a particle size of 30 to 50 nm.

The resultant aluminum oxide particles were further treated by heating at 1,250° C. in an air for one hour. The resultant aluminum oxide particles were subjected to an X-ray diffraction analysis. As a result, a spectrum corresponding to α-alumina was observed. Further, the shapes of the particles were observed with a transmission electron microscope. As a result, they were found to be square plate particles having a particle size of 40 to 60 nm (axis ratio: 5-10).

Synthesis of Plate ITO Particles:

Sodium hydroxide (0.75 mol) was dissolved in water (180 ml) to prepare an aqueous alkaline solution. Separately from this alkaline solution, an aqueous solution of tin chloride and indium chloride was prepared by dissolving indium chloride (III) tetrahydrate (0.067 mol) and tin chloride (IV) pentahydrate (0.007 mol) in water (400 ml). To the former aqueous alkaline solution, was added dropwise the latter aqueous solution of tin chloride and indium chloride to form a precipitate of a hydroxide or a hydrate comprising tin and indium. The pH of the precipitate was 10.2. A suspension of the precipitate was aged at room temperature for 20 hours, and then washed with water until the pH of the precipitate reached 7.6.

Next, to the suspension of the precipitate, was added an aqueous sodium hydroxide solution to adjust the pH to 10.8, and the suspension was charged in an autoclave and subjected to a hydrothermal treatment at 200° C. for 2 hours.

The resultant product was washed with water until its pH reached 7.8, and filtered and dried at 90° C. in an air. The dried product was slightly crushed in a mortar and treated by heating at 600° C. in an air for one hour. Thus, particles of tin-containing indium oxide were obtained. After the heat treatment, the tin-containing indium oxide particles were washed with water, using an ultrasonic dispersing machine, so as to remove the non-reacted product and residues. Then, the particles were filtered and dried.

The shapes of the resultant tin-containing indium oxide particles were observed with a transmission electron microscope. As a result, they were found to be disc or square plate particles having a particle size of 30 to 50 nm (axis ratio: 5-10).

The tin-containing indium oxide particles were subjected to an X-ray diffraction analysis. As a result, the X-ray diffraction spectrum indicated that the particles were composed of a single structure substance which was the tin-containing indium oxide in which indium was substituted by tin.

Synthesis of Plate Iron Oxide Particles:

Sodium hydroxide (0.75 mol) was dissolved in water (180 ml) to prepare an aqueous alkaline solution Separately from this alkaline solution, an aqueous ferric chloride solution was prepared by dissolving ferric (III) chloride hexahydrate (0.074 mol) in water (400 ml). To the former aqueous alkaline solution, was added dropwise the latter aqueous ferric chloride solution to form a precipitate containing ferric hydroxide which had a pH of 11.3. A suspension of the precipitate was aged for 20 hours and washed with water until its pH reached 7.5.

Next, the supernatant was removed, and the suspension of the precipitate was charged in an autoclave and subjected to a hydrothermal treatment at 150° C. for 2 hours.

The resultant product was filtered and dried at 90° C. in an air. The dried product was slightly crushed in a mortar and treated by heating at 600° C. in an air for one hour. Thus, alpha iron oxide particles were obtained. After the heat treatment, the particles were washed with water, using an ultrasonic dispersing machine, so as to remove the non-reacted product and residues. Then, the particles were further washed with water, using the ultrasonic dispersing machine, and filtered and dried.

The resultant alpha iron oxide particles were subjected to an X-ray diffraction spectral analysis. As a result, a spectrum corresponding to an alpha hematite structure was clearly observed. Further, the shapes of the particles were observed with a transmission electron microscope. As a result, they were found to be hexagonal plate particles having a particle size of 40 to 60 nm (axis ratio: 5-10).

| <Components of Paint for Primer Layer> | |
|---|---|
| (1) | |
| Plate alumina particles (average particle diameter: 50 nm) | 10 parts |
| Plate ITO particles (average particle diameter: 40 nm) | 90 parts |
| Stearic acid | 2.0 parts |
| Vinyl chloride-hydroxypropyl acrylate copolymer (—$SO_3$Na group content: $0.7 \times 10^{-4}$ eq./g) | 8.8 parts |
| Polyesterpolyurethane resin (Tg: 40° C., —$SO_3$Na group content: $1 \times 10^{-4}$ eq./g) | 4.4 parts |
| Cyclohexanone | 25 parts |
| Methyl ethyl ketone | 40 parts |
| Toluene | 10 parts |
| (2) | |
| Butyl stearate | 1 part |
| Cyclohexanone | 70 parts |
| Methyl ethyl ketone | 50 parts |
| Toluene | 20 parts |
| (3) | |
| Polyisocyanate | 1.4 parts |
| Cyclohexanone | 10 parts |
| Methyl ethyl ketone | 15 parts |
| Toluene | 10 parts |

| <Components of Paint for Magnetic Layer> | |
|---|---|
| (1) Kneading step | |
| Ultrafine magnetic powder (Nd—Fe—B) (Nd/Fe: 2.4 atomic %, B/Fe: 9.1 atomic %, σs: 16.6 µWb/g (132 emu/g), Hc: 192 kA/m (2,410 Oe), and Average axis length: 25 nm) | 100 parts |
| Vinyl chloride-hydroxypropyl acrylate copolymer (—$SO_3$Na group content: $0.7 \times 10^{-4}$ eq./g) | 14 parts |
| Polyesterpoyurethane resin (PU) (—$SO_3$Na group content: $1.0 \times 10^{-4}$ eq./g) | 5 parts |
| Plate alumina particles (average particle diameter: 50 nm) | 10 parts |
| Plate ITO particles (average particle diameter: 40 nm) | 5 parts |
| Methyl acid phosphate (MAP) | 2 parts |
| Tetrahydrofuran (THF) | 20 parts |
| Methyl ethyl ketone/cyclohexanone (MEK/A) | 9 parts |
| (2) Diluting step | |
| Palmitic amide (PA) | 1.5 parts |
| n-Butyl stearate (SB) | 1 part |

-continued

| <Components of Paint for Magnetic Layer> | |
|---|---|
| Methyl ethyl ketone/cyclohexanone (MEK/A) | 350 parts |
| (3) Compounding step | |
| Polyisocyanate | 1.5 parts |
| Methyl ethyl ketone/cyclohexanone (MEK/A) | 29 parts |

A paint for primer layer was prepared by kneading the components of Group (1) with a batch type kneader, adding the components of Group (2) to the mixture and stirring them, dispersing the mixed components with a sand mill in a residence time of 60 minutes, and adding the components of Group (3), followed by stirring and filtering the mixture.

Separately, a paint for magnetic layer was prepared by previously mixing the components for the kneading step (1) at a high rate and kneading the mixture with a continuous twin screw kneader, adding the components for the diluting step (2) and diluting the knead mixture with the continuous twin screw kneader in at least 2 steps, dispersing the mixture with a sand mill in a residence time of 45 minutes, and adding the components for the compounding step (2), followed by stirring and filtering the dispersion.

The paint for primer layer was applied on a non-magnetic support (base film) made of an aromatic polyamide film (Mictron (trade name) manufactured by Toray, thickness of 3.3 μm, MD=11 GPa, MD/TD=0.70) so that the primer layer could have a thickness of 0.6 μm after dried and calendered. Then, the paint for magnetic layer was applied on the primer layer by a wet-on-wet method so that the magnetic layer could have a thickness of 0.06 μm after the magnetic paint layer had been oriented in a magnetic field, dried and calendered. After the orientation in the magnetic field, the magnetic layer was dried with a drier and far infrared radiation to obtain a magnetic sheet. The orientation in the magnetic field was carried out by arranging N-N opposed magnets (5 kG) in front of the drier, and arranging, in the drier, two pairs of N-N opposed magnets (5 kG) at an interval of 50 cm and at a position 75 cm before a position where the dryness of the layer was felt by one's finger. The coating rate was 100 m/min.

| <Components of Paint for Backcoat Layer> | |
|---|---|
| Plate ITO particles (average particle diameter: 40 nm) | 80 parts |
| Carbon black (average particle diameter: 25 nm) | 10 parts |
| Plate iron oxide particles (average particle diameter: 50 nm) | 10 parts |
| Nitrocellulose | 45 parts |
| Polyurethane resin (containing —SO$_3$Na groups) | 30 parts |
| Cyclohexanone | 260 parts |
| Toluene | 260 parts |
| Methyl ethyl ketone | 525 parts |

The components of a paint for backcoat layer were dispersed with a sand mill in a residence time of 45 minutes and a polyisocyanate (15 parts) was added to the mixture to obtain a paint for backcoat layer. After filtration, the paint was coated on a surface of the magnetic sheet opposite to the magnetic layer so that the resultant backcoat layer could have a thickness of 0.5 μm after dried and calendered, and then, the backcoat layer was dried to finish the magnetic sheet.

The magnetic sheet, thus obtained, was planished by seven-stage calendering using metal rolls, at a temperature of 100° C. under a linear pressure of 200 kg/cm, and wound onto a core and aged at 70° C. for 72 hours. After that, the magnetic sheet was slit into tapes with a width of ½ inch.

A tape cut from the magnetic sheet was fed at a rate of 200 m/min. while the surface of the magnetic layer was being polished with a lapping tape and a blade, and wiped to provide a magnetic tape. As the lapping tape, K10000 was used; as the blade, a hard blade was used; and Toraysee (trade name) manufactured by Toray was used for wiping the magnetic layer. The tape was treated under a feeding tension of 0.294 N. After recording magnetic servo signals on the resultant magnetic tape with a servo writer, the magnetic tape was set in the cartridge shown in FIG. 1 to obtain a computer tape. The coercive force which was measured in the orientation direction of the magnetic tap, and the product (Br δ) of the residual magnetic flux density and the thickness of the magnetic tape were 226.4 kA/m and 0.019 μTm, respectively.

Example 2

A computer tape was made in the same manner as in Example 1, except that magnetic powder prepared by the following synthesis was used.

Synthesis of Ultrafine Magnetic Powder:

Iron nitrate (III) (0.098 mol), cobalt nitrate (0.042 mol) and neodymium nitrate (0.002 mol) were dissolved in water (200 cc). Separately from this aqueous nitrate solution, an aqueous sodium hydroxide solution was prepared by dissolving sodium hydroxide (0.42 mol) in water (200 cc). To the aqueous nitrate solution, was added the aqueous sodium hydroxide solution, and the mixture was stirred for 5 minutes to form a hydroxide of iron, cobalt and neodymium. This hydroxide was washed with water and filtered to collect the hydroxide. To the hydroxide (containing water), were further added water (150 cc) and boric acid (0.1 mol) so as to again disperse the hydroxide of iron, cobalt and neodymium in this aqueous boric acid solution. The resulting dispersion was treated by heating at 90° C. for 2 hours, and washed with water to remove the excessive boric acid. Then, the dispersion was dried at 60° C. for 4 hours to obtain a boric acid-containing hydroxide which comprised iron, cobalt and neodymium.

This hydroxide was dehydrated by heating at 300° C. in an air for 2 hours, and reduced by heating at 450° C. under a hydrogen stream for 4 hours to obtain neodymium-iron-cobalt-boron magnetic powder. Then, the magnetic powder was cooled to room temperature under a hydrogen stream, and again heated to 650° C. under an atmosphere of a mixed gas of nitrogen and oxygen. Then, the magnetic powder was treated for stabilization under the atmosphere of a mixed gas of nitrogen and oxygen for 8 hours, and exposed to an air.

The resultant neodymium-iron-cobalt-boron magnetic powder was subjected to a fluorescent X-ray analysis, and it was found that the content of neodymium to iron was 1.9 atomic %; the content of cobalt to iron, 40.1 atomic %; and the content of boron to iron, 7.5 atomic %. This magnetic powder was observed with a transmission electron microscope at a magnification of 250,000. As a result, the powder comprised substantially spherical or ellipsoidal particles with an average particle diameter of 20 nm, as in Example 1. The saturation magnetization of the magnetic powder under the application of a magnetic field of 1,273.3 kA/m was found to be 157 Am$^2$/kg (157 emu/g), and the coercive force thereof, 174.3 kA/m (2,190 Oe).

Example 3

A computer tape was made in the same manner as in Example 1 except that a magnetic powder having a particle size of 15 nm was prepared by the same method as of Example 1.

Example 4

A computer tape was made in the same manner as in Example 1, except that 10 parts by weight of the plate alumina particles (average particle diameter: 50 nm) and 5 parts by weight of the plate ITO particles (average particle diameter: 40 nm) in the paint for the magnetic layer were changed to 10 parts by weight of granular alumina particles (average particle diameter: 80 nm) and 2 parts by weight of carbon black particles (average particle diameter: 75 nm), respectively.

Example 5

A computer tape was made in the same manner as in Example 4, except that, in the components of the paint for the backcoat layer, 80 parts by weight of the plate ITO particles (average particle diameter: 40 nm) was changed to 0 parts by weight; 10 parts by weight of the carbon black particles (average particle diameter: 25 nm), to 80 parts by weight; 10 parts by weight of the plate iron oxide particles (average particle diameter: 50 nm), to 0 part by weight, and that 10 parts by weight of carbon black particles (average particle diameter: 0.35 μm) and 10 parts by weight of granular iron oxide particles (average particle diameter: 0.4 μm) were added to the paint for the backcoat layer.

Example 6

A computer tape was made in the same manner as in Example 1, except that the components for the paint for the primer layer in Example 1 were changed to the following.

| <Components of Paint for Primer Layer> | |
|---|---|
| (1) | |
| Needle iron oxide powder (average particle diameter: 100 nm; axis ratio: 5) | 68 parts |
| Granular alumina particles (average particle diameter: 80 nm) | 8 parts |
| Carbon black particles (average particle diameter: 25 nm) | 24 parts |
| Stearic acid | 2.0 parts |
| Vinyl chloride-hydroxypropyl acrylate copolymer (—SO$_3$Na group content: 0.7 × 10$^{-4}$ eq./g) | 8.8 parts |
| Polyestepolyrurethane resin (Tg: 40° C., —SO$_3$Na group content: 1 × 10$^{-4}$ eq./g) | 4.4 parts |
| Cyclohexanone | 25 parts |
| Methyl ethyl ketone | 40 parts |
| Toluene | 10 parts |
| (2) | |
| Butyl stearate | 1 part |
| Cyclohexanone | 70 parts |
| Methyl ethyl ketone | 50 parts |
| Toluene | 20 parts |
| (3) | |
| Polyisocyanate | 1.4 parts |
| Cyclohexanone | 10 parts |
| Methyl ethyl ketone | 15 parts |
| Toluene | 10 parts |

Example 7

A computer tape was made in the same manner as in Example 1, except that the compositions of <Paint for Primer Layer> and <Paint for Backcoat Layer> were changed to the following.

| <Components of Paint for Primer Layer> | |
|---|---|
| (1) | |
| Needle iron oxide powder (average particle diameter: 100 nm; axis ratio: 5) | 68 parts |
| Granular alumina particles (average particle diameter: 80 nm) | 8 parts |
| Carbon black particles (average particle diameter: 25 nm) | 24 parts |
| Stearic acid | 2.0 parts |
| Vinyl chloride-hydroxypropyl acrylate copolymer (—SO$_3$Na group content: 0.7 × 10$^{-4}$ eq./g) | 8.8 parts |
| Polyester-polyurethane resin (Tg: 40° C., —SO$_3$Na group content: 1 × 10$^{-4}$ eq./g) | 4.4 parts |
| Cyclohexanone | 25 parts |
| Methyl ethyl ketone | 40 parts |
| Toluene | 10 parts |
| (2) | |
| Butyl stearate | 1 part |
| Cyclohexanone | 70 parts |
| Methyl ethyl ketone | 50 parts |
| Toluene | 20 parts |
| (3) | |
| Polyisocyanate | 1.4 parts |
| Cyclohexanone | 10 parts |
| Methyl ethyl ketone | 15 parts |
| Toluene | 10 parts |

| <Components of Paint for Backcoat Layer> | |
|---|---|
| Carbon black particles (average particle diameter: 25 nm) | 80 parts |
| Carbon black particles (average particle diameter: 0.35 μm) | 10 parts |
| Granular iron oxide particles (average particle diameter: 50 nm) | 10 parts |
| Nitrocellulose | 45 parts |
| Polyurethane resin (containing SO$_3$Na groups) | 30 parts |
| Cyclohexanone | 260 parts |
| Toluene | 260 parts |
| Methyl ethyl ketone | 525 parts |

Example 8

In the synthesis of the ultrafine magnetic powder in Example 1, rare earth-iron nitride magnetic powder was used in place of the neodymium-iron-boron magnetic powder. The synthesis example using yttrium as a rare earth element is explained below:

Iron(II) sulfate heptahydrate (0.419 mole) and iron(III) nitrate nonahydrate (0.974 mole) were dissolved in water (1500 g). Separately, sodium hydroxide (3.76 moles) was dissolved in water (1500 g). Then, the aqueous solution of sodium hydroxide was added to the solution of the iron salts and stirred for 20 minutes to grow magnetite particles.

The magnetite particles were placed in an autoclave and heated at 200° C. for 4 hours. After hydrothermal treatment, the particles were washed with water to obtain spherical or ellipsoidal magnetite particles having a particle size of 25 nm.

The magnetic particles (10 g) was dispersed in water (500 cc) for 30 minutes using an ultrasonic disperser. Then, yttrium nitrate (2.5 g) was added to and dissolved in the dispersion followed by stirring for 30 minutes. Separately, sodium hydroxide (0.8 g) was dissolved in water (100 cc). Then, the solution of sodium hydroxide was dropwise added to the suspension of the magnetic particles over about 30 minutes followed by stirring for 1 hour. With this treatment, yttrium hydroxide was deposited on the surfaces of the magnetite particles.

The magnetite particles carrying the deposited yttrium hydroxide were washed with water, recovered by filtration and then dried at 90° C. to obtain magnetite particles carrying yttrium hydroxide deposited on their surfaces.

Those magnetite particles were reduced by heating in a hydrogen gas stream at 450° C. for 2 hours to obtain an yttrium-iron magnetic powder. Then, the temperature was lowered to 150° C. over about 1 hour while flowing the hydrogen gas. When the temperature reached 150° C., the hydrogen gas was switched to an ammonia gas, and the magnetite particles were nitrided with ammonia for 30 hours while keeping the temperature at 150° C. Thereafter, the temperature was lowered from 150° C. to 90° C. while flowing the ammonia gas. When the temperature reached 90° C., the ammonia gas was switched to a nitrogen gas containing oxygen and the particles were stabilized for 2 hours.

The temperature was then lowered from 90° C. to 40° C. while flowing the oxygen-containing nitrogen gas, and the particles were maintained at 40° C. for 10 hours and recovered in the air.

According to the X-ray fluorescent analysis, the obtained yttrium-iron nitride magnetic powder contained 5.3 atomic % of yttrium and 10.8 atomic % of nitrogen based on iron.

Figure 4:
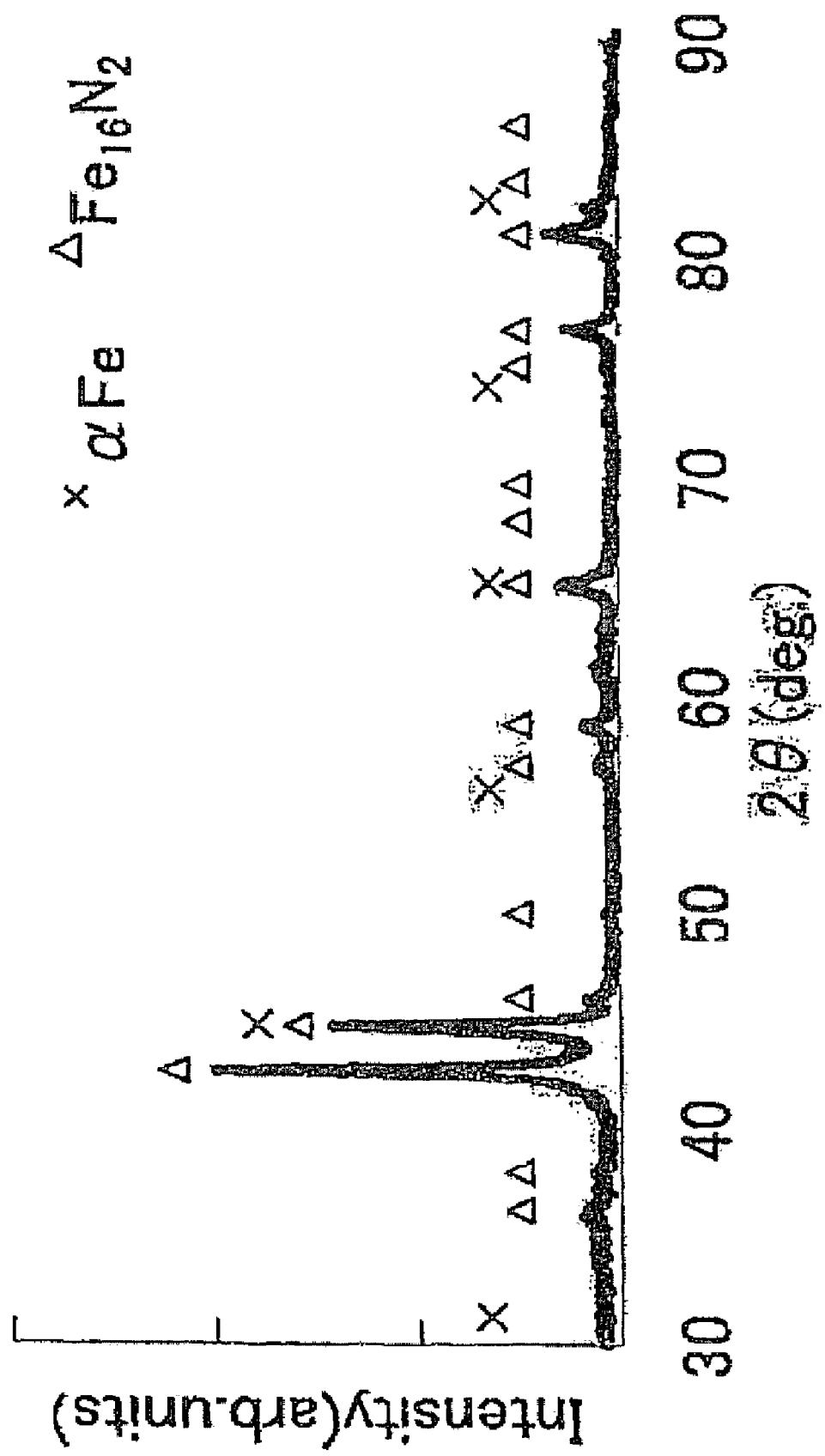
FIG. 4 is a X-ray diffraction pattern of the yttrium-iron nitride magnetic powder prepared in Example 8.

FIG. 4 shows the X-ray diffraction pattern of this yttrium-iron nitride magnetic powder, in which the diffraction peaks assigned to $Fe_{16}N_2$ and $\alpha$-Fe are observed. These peaks confirmed that the powder had a mixed phase of iron nitride having the structure of $Fe_{16}N_2$ and the $\alpha$-Fe phase.

Figure 5:
FIG. 5 is a transmission type electron microphotograph of the particles of yttrium-iron nitride magnetic powder prepared in Example 8 (magnification: 200,000).

When the obtained magnetic powder was observed with a high resolution transmission electron microscope, the particles had a shape close to a sphere and an average particle size of 20 nm. FIG. 5 shows the transmission electron microscopic photograph of this magnetic powder (magnification: 200,000 times).

The powder had a BET specific surface of 53.2 $m^2/g$.

The magnetic powder had a saturation magnetization of 135.2 $Am^2/kg$ (135.2 emu/g) and a coercive force of 226.9 kA/m (2850 Oe) when measured with applying a magnetic field of 1270 kA/m (16 kOe). After maintaining the magnetic powder at 60° C., 90% RH for one week, the magnetic powder had a saturation magnetization of 118.2 $Am^2/kg$ (118.2 emu/g), which means that a preservation rate of saturation magnetization was 87.4%.

Using the rare earth element-iron nitride magnetic powder produced in the above, a magnetic paint was prepared in the same manner as in Example 1. In the preparation of the magnetic paint, the rare earth element-iron nitride magnetic powder, which was prepared by scaling up the procedures of this example by 100 times, was used.

Then, a computer tape was produced in the same manner as in Example 1 except that the composition of the primer layer was changed as shown in Table 1.

Comparative Example 1

A computer tape was made in the same manner as in Example 1, except that the compositions of the kneading step (1) in <Components of Paint for Magnetic Layer> and the components of <Paint for Primer Layer> and <Paint for Backcoat Layer> were changed to the following. In this regard, the magnetic powder was changed to magnetic powder comprising needle particles with a particle diameter (average axial length) of 100 nm, and therefore, the thickness of the magnetic layer could not be controlled to 0.06 μm, and it resulted in 0.11 μm.

| | |
|---|---|
| Needle ferromagnetic iron type metal powder (Co/Fe: 30 atomic %, Y/(Fe + Co): 3 atomic %, Al/(Fe + Co): 5 weight %, σs: 145 A · $m^2$/kg (145 emu/g), Hc: 187 kA/m (2,350 Oe) | 100 parts |
| Vinyl chloride-hydroxypropyl acrylate copolymer (—$SO_3Na$ group content: 0.7 × $10^{-4}$ eq./g) | 14 parts |
| Polyesterpolyurethane resin (PU) (—$SO_3Na$ group content: 1.0 × $10^{-4}$ eq./g) | 5 parts |
| Granular alumina particles (average particle diameter: 80 nm) | 10 parts |
| Carbon black particles (average particle diameter: 75 nm) | 5 parts |
| Methyl acid phosphate (MAP) | 2 parts |
| Tetrahydrofuran (THF) | 20 parts |
| Methyl ethyl ketone/cyclohemanone (MEK/A) | 9 parts |

<Components of Paint for Primer Layer>

(1)

| | |
|---|---|
| Needle iron oxide powder (average particle diameter: 100 nm; axis ratio: 5) | 68 parts |
| Granular alumina particles (average particle diameter: 80 nm) | 8 parts |
| Carbon black particles (average particle diameter: 25 nm) | 24 parts |
| Stearic acid | 2.0 parts |
| Vinyl chloride-hydroxypropyl acrylate copolymer (—$SO_3Na$ group content: 0.7 × $10^{-4}$ eq./g) | 8.8 parts |
| Polyester-polyurethane resin (Tg: 40° C., —$SO_3Na$ group content: 1 × $10^{-4}$ eq./g) | 4.4 parts |
| Cyclohexanone | 25 parts |

-continued

<Components of Paint for Primer Layer>

| | |
|---|---|
| Methyl ethyl ketone | 40 parts |
| Toluene | 10 parts |
| (2) | |
| Butyl stearate | 1 part |
| Cyclohexanone | 70 parts |
| Methyl ethyl ketone | 50 parts |
| Toluene | 20 parts |
| (3) | |
| Polyisocyanate | 1.4 parts |
| Cyclohexanone | 10 parts |
| Methyl ethyl ketone | 15 parts |
| Toluene | 10 parts |

<Components of Paint for Backcoat Layer>

| | |
|---|---|
| Carbon black particles | 80 parts |
| (average particle diameter: 25 nm) | |
| Carbon black particles | 10 parts |
| (average particle diameter: 0.35 μm) | |
| Granular iron oxide particles | 10 parts |
| (average particle diameter: 50 nm) | |
| Nitrocellulose | 45 parts |
| Polyurethane resin | 30 parts |
| (containing SO$_3$Na groups) | |
| Cyclohexanone | 260 parts |
| Toluene | 260 parts |
| Methyl ethyl ketone | 525 parts |

The methods for evaluation were as follows.

<Surface Roughness of Magnetic Layer>

The surface roughness of the magnetic layer was measured at a scan length of 5 μm by a scanning type white light interference method, using an universal three-dimensional surface structure analyzer, NewView 5000 manufactured by ZYGO. The view field for measurement was 350 μm×260 μm. The center line average height of the surface roughness of the magnetic layer was measured as Ra.

<Magnetic Properties>

The magnetic properties were measured with a sample-vibration type magnetometer at 25° C. in an applied magnetic field of 1,273.3 kA/m like the measurement of the magnetic properties of the magnetic powder. In this measurement, 20 pieces of the magnetic recording medium were laminated, and blanked to obtain a circular sample having a diameter of 8 mm, and the measured values were compensated using a standard sample.

The anisotropic magnetic field distribution was obtained by measuring a differential curve in the second quadrant of the hysteresis loop of the tape (demagnetization curve) and dividing a magnetic field corresponding to the half-width value of the differential curve by the coercive force of the tape. That is, as the coercive force distribution of the magnetic powder is narrower or the dispersion and orientation of the magnetic powder in the tape is better, Ha is smaller. When the coercive force is the same, the smaller Ha leads to the better recording characteristics in particular in the short wavelength range.

<Output and Ratio of Output to Noises>

The electromagnetic conversion characteristics of the magnetic tape were measured using a drum tester. The drum tester was equipped with an electromagnetic induction type head (track width: 25 μm, gap: 0.1 μm) and a MR head (8 μm) so that the induction type head was used for recording, and the MR head, for reproducing. Both heads were arranged at different positions relative to the rotary drum, and both heads were operated in the vertical direction to match their tracking with each other. A proper length of the magnetic tape was drawn out from the reel in the cartridge and discarded. A further 60 cm length of the magnet tape was drawn out and cut and processed into a tape with a width of 4 mm, which was then wound onto the outer surface of the drum.

Output and noises were determined as follows. A rectangular wave with a wavelength of 0.2 μm was written on the magnetic tape, using a function generator, and the output from the MR head was read by the spectrum analyzer. The value of a carrier with a wavelength of 0.2 μm was defined as an output C from the medium. The value of integration of values, which are obtained by subtracting the output and system noise from the components of spectra corresponding to a recording wavelength of 0.2 μm or more, was used as a noise value N, when the rectangular wave with a wavelength of 0.2 μm was written on the magnetic tape. The ratio of the output to the noise was calculated as C/N. C and C/N are reported as relative values in relation to the values of the tape of Comparative Example 1.

<Coefficients of Temperature/Humidity Expansions of Tape>

Test pieces with a width of 12.65 mm and a length of 150 mm were prepared from the magnetic sheet along the widthwise direction. The temperature expansion coefficient was determined from difference in length between each of the test pieces exposed to atmospheres of 20° C. and 60% RH, and of 40° C. and 60% RH, respectively. The humidity expansion coefficient was determined from difference in length between each of the test pieces exposed to atmospheres of 20° C. and 30% RH, and of 20° C. and 70% RH, respectively.

<Off-Track Amount>

An off-track amount was measured as follows:

The magnetic tape was recorded at a recording wavelength of 0.55 μm using a modified LTO drive at a temperature of 20° C. and a humidity of 45% RH, and then the reproducing outputs were measured at a temperature of 20° C. and a humidity of 45% RH and at a temperature of 35° C. and a humidity of 70% RH. A ratio of the former output to the latter output was used as an off-track amount.

Table 1 shows the results of the properties of the magnetic tapes of Examples 1-8 and Comparative Examples as well as the conditions employed in Examples and Comparative Examples.

TABLE 1

|  |  |  | Ex. 1 | Ex. 2 | Ex. 3 |
|---|---|---|---|---|---|
| Magnetic layer | Magnetic powder | Elements | Nd—Fe—B | Nd—Fe—Co—B | Nd—Fe—B |
|  |  | Particle size (nm) | 25 | 20 | 15 |
|  | Filler | Plate alumina (50 nm) | 10 | 10 | 10 |
|  |  | Plate alumina (80 nm) | — | — | — |
|  |  | CB (75 nm) | — | — | — |
|  |  | Plate ITO (40 nm) | 5 | 5 | 5 |
|  | Surface roughness Ra (nm) |  | 2.2 | 2.4 | 2.1 |
|  | Coercive force (kA/m) |  | 226.4 | 212.6 | 201.4 |
|  | Squareness ratio |  | 0.83 | 0.82 | 0.80 |
|  | Br · δ (μTm) |  | 0.019 | 0.018 | 0.016 |
|  | Anisotropic magnetic field distribution (Ha) |  | 0.55 | 0.57 | 0.63 |
| Primer layer | Filler | Plate alumina (50 nm) | 10 | 10 | 10 |
|  |  | Plate iron oxide (50 nm) | — | — | — |
|  |  | Acicular iron oxide (100 nm) | — | — | — |
|  |  | Particle alumina (80 nm) | — | — | — |
|  |  | CB (25 nm) | — | — | — |
|  |  | Plate ITO (40 nm) | 90 | 90 | 90 |
| Backcoat layer | Filler | CB (25 nm) | 10 | 10 | 10 |
|  |  | CB (0.35 μm) | — | — | — |
|  |  | particulate iron oxide (0.4 μm) | — | — | — |
|  |  | Plate iron oxide (50 nm) | 10 | 10 | 10 |
|  |  | Plate ITO (40 nm) | 80 | 80 | 80 |
| Thickness of magnetic layer (μm) |  |  | 0.06 | 0.06 | 0.06 |
| Thickness of primer layer (μm) |  |  | 0.6 | 0.6 | 0.6 |
| Thickness of support (μm) |  |  | 3.3 | 3.3 | 3.3 |
| Thickness of backcoat layer (μm) |  |  | 0.5 | 0.5 | 0.5 |
| Total thickness (μm) |  |  | 4.46 | 4.46 | 4.46 |
| C (dB) |  |  | 2.2 | 2.6 | 2 |
| C/N (dB) |  |  | 8.4 | 9.5 | 10.5 |
| Coef. of thermal expansion (×10$^{-6}$/° C.) |  |  | 8.8 | 9 | 8.7 |
| Coef. of humidity expansion (×10$^{-6}$/% RH) |  |  | 1.2 | 1.1 | 1.1 |
| Off-track amount (μm) |  |  | 0.9 | 0.8 | 1 |
| Block error rate |  |  | — | — | — |

|  |  |  | Ex. 4 | Ex. 5 | Ex. 6 |
|---|---|---|---|---|---|
| Magnetic layer | Magnetic powder | Elements | Nd—Fe—B | Nd—Fe—B | Nd—Fe—B |
|  |  | Particle size (nm) | 25 | 25 | 25 |
|  | Filler | Plate alumina (50 nm) | — | — | 10 |
|  |  | Granular alumina (80 nm) | 10 | 10 | — |
|  |  | CB (75 nm) | 2 | 2 | — |
|  |  | Plate ITO (40 nm) | — | — | 5 |
|  | Surface roughness Ra (nm) |  | 3.4 | 3.8 | 3.2 |
|  | Coercive force (kA/m) |  | 231.5 | 231.5 | 226.3 |
|  | Squareness ratio |  | 0.82 | 0.82 | 0.83 |
|  | Br · δ (μTm) |  | 0.019 | 0.019 | 0.019 |
|  | Anisotropic magnetic field distribution (Ha) |  | 0.54 | 0.54 | 0.55 |
| Primer layer | Filler | Plate alumina (50 nm) | 10 | 10 | — |
|  |  | Plate iron oxide (50 nm) | — | — | — |
|  |  | Acicular iron oxide (100 nm) | — | — | 68 |
|  |  | Granular alumina (80 nm) | — | — | 8 |
|  |  | CB (25 nm) | — | — | 24 |
|  |  | Plate ITO (40 nm) | 90 | 90 | — |
| Backcoat layer | Filler | CB (25 nm) | 10 | 80 | 10 |
|  |  | CB (0.35 μm) | — | 10 | — |
|  |  | Granular iron oxide (0.4 μm) | — | 10 | — |
|  |  | Plate iron oxide (50 nm) | 10 | — | 10 |
|  |  | Plate ITO (40 nm) | 80 | — | 80 |
| Thickness of magnetic layer (μm) |  |  | 0.06 | 0.06 | 0.06 |
| Thickness of primer layer (μm) |  |  | 0.6 | 0.6 | 0.6 |
| Thickness of support (μm) |  |  | 3.3 | 3.3 | 3.3 |
| Thickness of backcoat layer (μm) |  |  | 0.5 | 0.5 | 0.5 |
| Total thickness (μm) |  |  | 4.46 | 4.46 | 4.46 |
| C (dB) |  |  | 1.8 | 1.4 | 1.6 |

TABLE 1-continued

|  |  |  |  |  |
|---|---|---|---|---|
| C/N (dB) | | 8 | 7.2 | 6.5 |
| Coef. of thermal expansion (×10⁻⁶/° C.) | | 9 | 9.7 | 9.9 |
| Coef. of humidity expansion (×10⁻⁶/% RH) | | 1.3 | 1.8 | 2 |
| Off-track amount (μm) | | 1.1 | 1.4 | 1.3 |
| Block error rate | | — | — | — |

|  |  |  | Ex. 7 | Ex. 8 | C. Ex. 1 |
|---|---|---|---|---|---|
| Magnetic layer | Magnetic powder | Elements | Y—Fe—Co | Y—N—Fe | Nd—Fe—Co |
| | | Particle size (nm) | 25 | 20 | 25 |
| | Filler | Plate alumina (50 nm) | 10 | 10 | — |
| | | Granular alumina (80 nm) | — | — | 10 |
| | | CB (75 nm) | — | — | 2 |
| | | Plate ITO (40 nm) | 5 | 5 | 5 |
| | Surface roughness Ra (nm) | | 3.5 | 2.2 | 4.2 |
| | Coercive force (kA/m) | | 226.3 | 299.5 | 195.0 |
| | Squareness ratio | | 0.83 | 0.84 | 0.84 |
| | Br · δ (μTm) | | 0.019 | 0.020 | 0.039 |
| | Anisotropic magnetic field distribution (Ha) | | 0.55 | 0.50 | 0.65 |
| Primer layer | Filler | Plate alumina (50 nm) | — | — | — |
| | | Plate iron oxide (50 nm) | — | 10 | — |
| | | Acicular iron oxide (100 nm) | 68 | — | 68 |
| | | Granular alumina (80 nm) | 8 | — | 8 |
| | | CB (25 nm) | 24 | — | 24 |
| | | Plate ITO (40 nm) | — | 90 | — |
| Backcoat layer | Filler | CB (25 nm) | 80 | 10 | 80 |
| | | CB (0.35 μm) | 10 | — | 10 |
| | | Granular iron oxide (0.4 μm) | 10 | — | 10 |
| | | Plate iron oxide (50 nm) | — | 10 | — |
| | | Plate ITO (40 nm) | — | 80 | — |
| Thickness of magnetic layer (μm) | | | 0.06 | 0.06 | 0.11 |
| Thickness of primer layer (μm) | | | 0.6 | 0.6 | 0.6 |
| Thickness of support (μm) | | | 3.3 | 3.3 | 3.3 |
| Thickness of backcoat layer (μm) | | | 0.5 | 0.5 | 0.5 |
| Total thickness (μm) | | | 4.46 | 4.46 | 4.51 |
| C (dB) | | | 1.3 | 3.1 | 0 |
| C/N (dB) | | | 6.0 | 12.5 | 0 |
| Coef. of thermal expansion (×10⁻⁶/° C.) | | | 10.2 | 8.8 | 10.5 |
| Coef. of humidity expansion (×10⁻⁶/% RH) | | | 2 | 1.1 | 2.2 |
| Off-track amount (μm) | | | 2 | 0.8 | 2.1 |
| Block error rate | | | — | 6xE−04* | — |

Note: *The magnetic sheet was slit into a tape with a width of ½ inch and set in a DDS cartridge and then a block error rate was measured in the same manner as in Examples 9-15 and Comparative Examples 2–5 using a DDS drive (C 1554A).

As is apparent from Table 1, the magnetic tapes for a computer (magnetic recording media) having a total thickness of less than 6 μm or less, which were produced in Examples 1-8 and contained the substantially spherical or ellipsoidal rare earth element-iron type magnetic powders in the uppermost magnetic layer according to the present invention, had better electromagnetic conversion characteristics (C and C/N) than the computer tape of Comparative Example 1 which contained the acicular metal magnetic powder in the uppermost magnetic layer. In particular, the computer tape which contained the substantially spherical or ellipsoidal rare earth element-iron nitride magnetic powder in the uppermost magnetic layer (Example 8) had the excellent electromagnetic conversion characteristics (C and C/N). Furthermore, the linear recording type computer tapes, which contained the substantially spherical or ellipsoidal rare earth element-iron type magnetic powder in the uppermost magnetic layer and contained the non-magnetic plate powder in the primer layer and/or the backcoat layer, showed the small off-track amount when the temperature and humidity changed, since they had good temperature/humidity stability.

Example 9

An yttrium-iron nitride magnetic powder was produced in the same manner as in Example 8 except that magnetite particles having an average particle diameter of 20 nm was used as the raw material in place of the magnetite particles having an average particle diameter of 25 nm. The magnetite particles having an average particle diameter of 20 nm were prepared by the same manner as that for the production of the magnetite particles in Example 8 except that the hydrothermal treatment conditions were changed from 200° C. and 4 hour to 180° C. and 4 hours.

According to the X-ray fluorescent analysis, the obtained yttrium-iron nitride magnetic powder contained 5.5 atomic % of yttrium and 11.9 atomic % of nitrogen based on iron. The X-ray diffraction pattern of this magnetic powder showed the profile corresponding to the $Fe_{16}N_2$ phase.

The obtained magnetic powder was observed with a high resolution transmission electron microscope. The particles had spherical or ellipsoidal shapes and an average particle size of 17 nm. The powder had a BET specific surface of 60.1 m²/g.

The magnetic powder had a saturation magnetization of 130.5 Am²/kg (130.5 emu/g) and a coercive force of 211.0 kA/m (2650 Oe) when measured with applying a magnetic field of 1270 kA/m (16 kOe). After maintaining the magnetic powder at 60° C., 90% RH for one week, the magnetic powder had a saturation magnetization of 106.9 Am²/kg (106.9 emu/g), which means that a preservation rate of saturation magnetization was 81.9%.

Using the rare earth element-iron nitride magnetic powder produced in the above steps, a magnetic paint was prepared in the same manner as in Example 1.

In the preparation of the magnetic paint, the rare earth element-iron nitride magnetic powder, which was prepared by scaling up the procedures of this example by 100 times, was used.

Furthermore, a primer paint and a backcoat paint were prepared in the same manner as in Example 1. These paints contained the plate oxide particles such as plate alumina and plate ITO, which were the same as those explained in Example 1.

Using the magnetic paint, the primer paint and the backcoat paint, a magnetic tape was produced by applying these paints under the same conditions as those in Example 1.

Then, the magnetic sheet, which had been planished and aged in the same manner as in Example 1, was slit into a tape with a width of ½ inch, and the tape was post treated by lapping tape polishing, blade polishing and surface wiping to obtain a magnetic tape. This magnetic tape was set in a DDS cartridge to obtain a computer tape. The coercive force which was measured in the orientation direction of the magnetic tap, and the product (Br δ) of the residual magnetic flux density and the thickness of the magnetic tape were 278.5 kA/m and 0.019 μTm, respectively.

Example 10

A yttrium-iron nitride magnetic powder was produced in the same manner as in Example 8 except that magnetite particles having an average particle diameter of 30 nm was used as the raw material in place of the magnetite particles having an average particle diameter of 25 nm. The magnetite particles having an average particle diameter of 20 nm were prepared by the same manner as that for the production of the magnetite particles in Example 8 except that the hydrothermal treatment conditions were changed from 200° C. and 4 hour to 220° C. and 4 hours.

According to the X-ray fluorescent analysis, the obtained yttrium-iron nitride magnetic powder contained 4.8 atomic % of yttrium and 10.1 atomic % of nitrogen based on iron. The X-ray diffraction pattern of this magnetic powder showed the profile corresponding to the $Fe_{16}N_2$ phase.

Figure 6:
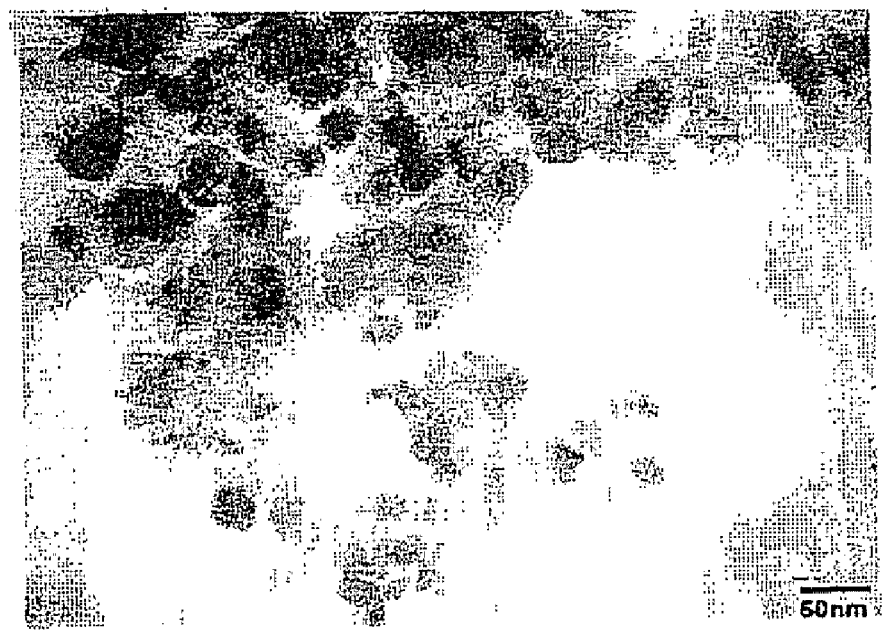
FIG. 6 is a transmission type electron microphotograph of the particles of yttrium-iron nitride magnetic powder prepared in Example 10 (magnification: 200,000).
Figure 7:
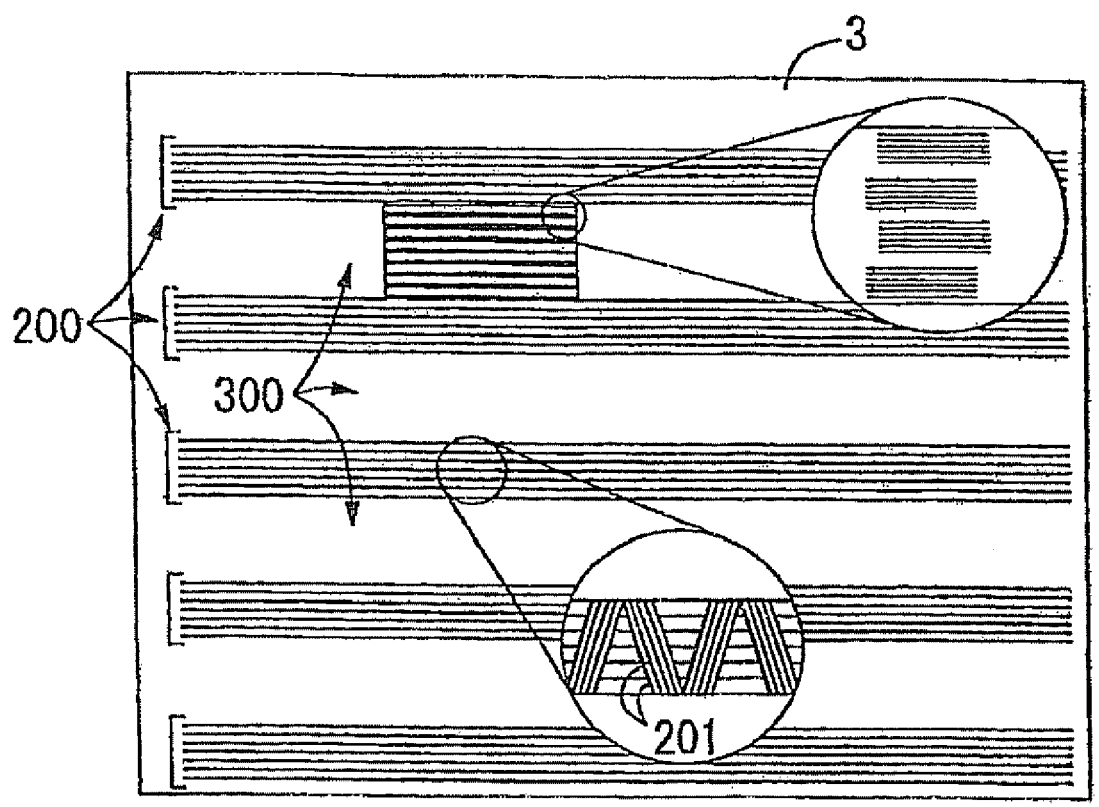
FIG. 7 is a schematic figure, which explains a magnetic servo system as one example of track servo systems used with magnetic tapes, in which data tracks and servo bands are alternately provided on the magnetic recording surface (magnetic layer) of a magnetic tape.

When the obtained magnetic powder was observed with a high resolution transmission electron microscope, the powder had a BET specific surface of 42.0 m²/g. FIG. 6 shows the transmission electron microscopic photograph of this magnetic powder (magnification; 200,000 times). The particles had spherical or ellipsoidal shapes and an average particle size of 27 nm.

The magnetic powder had a saturation magnetization of 155.1 Am²/g (155.1 emu/g) and a coercive force of 235.4 kA/m (2957 Oe), when measured with applying a magnetic field of 1270 kA/m (16 kOe). After maintaining the magnetic powder at 60° C., 90% RH for one week, the magnetic powder had a saturation magnetization of 140.1 Am²/kg (140.1 emu/g), which means that a preservation rate of saturation magnetization was 90.3%.

Using the rare earth element-iron nitride magnetic powder produced in the above steps, a magnetic paint was prepared in the same manner as in Example 1.

In the preparation of the magnetic paint, the rare earth element-iron nitride magnetic powder, which was prepared by scaling up the procedures of this example by 100 times, was used.

Furthermore, a primer paint and a backcoat paint were prepared in the same manner as in Example 1. These paints contained the plate oxide particles such as plate alumina and plate ITO, which were the same as those explained in Example 1.

Using the magnetic paint, the primer paint and the backcoat paint, a magnetic tape was produced in the same manner as in Example 9. This magnetic tape was set in a DDS cartridge to obtain a computer tape. The coercive force which was measured in the orientation direction of the magnetic tap, and the product (Br δ) of the residual magnetic flux density and the thickness of the magnetic tape were 294.3 kA/m and 0.023 μTm, respectively.

Example 11

An yttrium-iron nitride magnetic powder was prepared in the same manner as in Example 8 except that the amount of yttrium nitrate added was changed from 2.5 g to 7.4 g and the amount of sodium hydroxide added was changed from 0.8 g to 2.3 g.

According to the X-ray fluorescent analysis, the obtained yttrium-iron nitride magnetic powder contained 14.6 atomic % of yttrium and 9.5 atomic % of nitrogen based on iron. The X-ray diffraction pattern of this magnetic powder showed the profile corresponding to the $Fe_{16}N_2$ phase.

The obtained magnetic powder was observed with a high resolution transmission electron microscope. The particles had spherical or ellipsoidal shapes and an average particle size of 21 nm. The powder had a BET specific surface of 64.3 m²/g.

The magnetic powder had a saturation magnetization of 105.8 Am²/g (105.8 emu/g) and a coercive force of 232.5 kA/m (2920 Oe), when measured with applying a magnetic field of 1270 kA/m (16 kOe). After maintaining the magnetic powder at 60° C., 90% RH for one week, the magnetic powder had a saturation magnetization of 95.8 Am²/kg (95.8 emu/g), which means that a preservation rate of saturation magnetization was 90.5%.

Using the rare earth element-iron nitride magnetic powder produced in the above steps, a magnetic paint was prepared in the same manner as in Example 1.

In the preparation of the magnetic paint, the rare earth element-iron nitride magnetic powder, which was prepared by scaling up the procedures of this example by 100 times, was used.

Furthermore, a primer paint and a backcoat paint were prepared in the same manner as in Example 1. These paints contained the plate oxide particles such as plate alumina and plate ITO, which were the same as those explained in Example 1.

Using the magnetic paint, the primer paint and the backcoat paint, a magnetic tape was produced in the same manner as in Example 9. This magnetic tape was set in a DDS cartridge to obtain a computer tape. The coercive force which was measured in the orientation direction of the magnetic tap, and the product (Br δ) of the residual magnetic flux density and the thickness of the magnetic tape were 297.6 kA/m and 0.017 μTm, respectively.

Example 12

An yttrium-iron nitride magnetic powder was prepared in the same manner as in Example 8 except that the nitriding temperature was changed from 150° C. to 130° C.

According to the X-ray fluorescent analysis, the obtained yttrium-iron nitride magnetic powder contained 5.3 atomic % of yttrium and 6.2 atomic % of nitrogen based on iron. The X-ray diffraction pattern of this magnetic powder showed the profile corresponding to the $Fe_{16}N_2$ phase.

The yttrium-iron nitride magnetic powder consisted of the substantially spherical or ellipsoidal particles, and had an average particle size of 20 nm. The powder had a BET specific surface of 50.5 $m^2/g$.

The magnetic powder had a saturation magnetization of 145.0 $Am^2/g$ (145.0 emu/g) and a coercive force of 215.0 kA/m (2700 Oe), when measured with applying a magnetic field of 1270 kA/m (16 kOe). After maintaining the magnetic powder at 60° C., 90% RH for one week, the magnetic powder had a saturation magnetization of 120.1 $Am^2/kg$ (120.1 emu/g), which means that a preservation rate of saturation magnetization was 82.8%.

Using the rare earth element-iron nitride magnetic powder produced in the above steps, a magnetic paint was prepared in the same manner as in Example 1.

In the preparation of the magnetic paint, the rare earth element-iron nitride magnetic powder, which was prepared by scaling up the procedures of this example by 100 times, was used.

Furthermore, a primer paint and a backcoat paint were prepared in the same manner as in Example 1. These paints contained the plate oxide particles such as plate alumina and plate ITO, which were the same as those explained in Example 1.

Using the magnetic paint, the primer paint and the backcoat paint, a magnetic tape was produced in the same manner as in Example 9. This magnetic tape was set in a DDS cartridge to obtain a computer tape. The coercive force which was measured in the orientation direction of the magnetic tap, and the product (Br δ) of the residual magnetic flux density and the thickness of the magnetic tape were 266.6 kA/m and 0.022 μTm, respectively.

Example 13

An yttrium-iron nitride magnetic powder was prepared in the same manner as in Example 8 except that the nitriding temperature was changed from 150° C. to 170° C.

According to the X-ray fluorescent analysis, the obtained yttrium-iron nitride magnetic powder contained 5.1 atomic % of yttrium and 15.1 atomic % of nitrogen based on iron. The X-ray diffraction pattern of this magnetic powder showed the profile corresponding to the $Fe_{16}N_2$ phase.

The obtained magnetic powder was observed with a high resolution transmission electron microscope. The particles had spherical or ellipsoidal shapes and an average particle size of 21 nm. The powder had a BET specific surface of 54.6 $m^2/g$.

The magnetic powder had a saturation magnetization of 123.3 $Am^2/g$ (123.3 emu/g) and a coercive force of 226.1 kA/m (2840 Oe), when measured with applying a magnetic field of 1270 kA/m (16 kOe). After maintaining the magnetic powder at 60° C., 90% RH for one week, the magnetic powder had a saturation magnetization of 105.2 $Am^2/kg$ (105.2 emu/g), which means that a preservation rate of saturation magnetization was 85.3%.

Using the rare earth element-iron nitride magnetic powder produced in the above steps, a magnetic paint was prepared in the same manner as in Example 1.

In the preparation of the magnetic paint, the rare earth element-iron nitride magnetic powder, which was prepared by scaling up the procedures of this example by 100 times, was used.

Furthermore, a primer paint and a backcoat paint were prepared in the same manner as in Example 1. These paints contained the plate oxide particles such as plate alumina and plate ITO, which were the same as those explained in Example 1.

Using the magnetic paint, the primer paint and the backcoat paint, a magnetic tape was produced in the same manner as in Example 9. This magnetic tape was set in a DDS cartridge to obtain a computer tape. The coercive force which was measured in the orientation direction of the magnetic tap, and the product (Br δ) of the residual magnetic flux density and the thickness of the magnetic tape were 293.6 kA/m and 0.019 μTm, respectively.

Comparative Example 2

An oxide containing iron only was prepared in the same manner as in the synthesis of the ultrafine magnetic powder of Example 1 except that no neodymium nitrate was added. To this oxide, boric acid was added in the same manner as in Example 1 to obtain a uniform mixture of iron hydroxide and boric acid. This mixture was heated under the same conditions as those employed in Example 1 and washed with water to obtain iron oxide particles to which boron was bonded. The oxide particles were reduced by heating and stabilized under the same conditions as those used in Example 1. The resultant magnetic powder was observed with a transmission electron microscope (magnification: 100,000 times). Although the particle shapes were substantially spherical or ellipsoidal, they had a wide particle size distribution and an average particle size of about 100 nm.

The magnetic powder had a saturation magnetization of 165.2 $Am^2/g$ (165.2 emu/g) and a coercive force of 35.8 kA/m (450 Oe), when measured with applying a magnetic field of 1273.3 kA/m (16 kOe).

The magnetic powder was produced by scaling up the above procedure by 100 times, and then a magnetic powder was prepared using this magnetic powder in the same manner as in Example 1. It was tried to prepare a magnetic tape using this magnetic paint in the same manner as in Example 9. However, since the magnetic powder had the large particle size and also the wide particle size distribution, the coated layer was very much uneven and thus a magnetic layer having a uniform thickness of 0.06 μm could not be formed. Such a result indicated that, even if the particle shape was spherical or ellipsoidal, the use of the magnetic powder having a particle size outside the range of the present invention could not lead to the formation of a uniform coating layer in a very thin thickness range of the magnetic layer.

The coercive force which was measured in the orientation direction of the magnetic tap, and the product (Br δ) of the residual magnetic flux density and the thickness of the magnetic tape were 46.5 kA/m and 0.020 μTm, respectively.

Comparative Example 3

A magnetic powder was prepared in the same manner as in the synthesis of the ultrafine magnetic powder of Example 8 except that the spherical or ellipsoidal magnetite particles having a particle size of 25 nm were reduced by heating them in a hydrogen stream at 400° C. for 2 hours without adhering using yttrium. Then, the reduced particles were heated up to 90° C. with flowing hydrogen gas, and then subjected to the stabilization treatment for 2 hours after changing the hydrogen gas to a mixed gas of oxygen and nitrogen. After that, while flowing the mixed gas, the particles were cooled from 90° C. to 40° C. and maintained at 40° C. for about 10 hours and then recovered in an air. When the resultant magnetic powder was observed with a high resolution transmission electron microscope, the particles had a spherical or ellipsoidal shape and an average particle size of 70 μm. The powder had a BET specific surface of 15.6 m²/g.

The magnetic powder had a saturation magnetization of 195.2 Am²/kg (195.2 emu/g) and a coercive force of 49.4 kA/m (620 Oe) when measured with applying a magnetic field of 1270 kA/m (16 kOe).

The magnetic powder was produced by scaling up the above procedure by 100 times, and then a magnetic powder was prepared using this magnetic powder in the same manner as in Example 1. It was tried to prepare a magnetic tape with a thickness of 0.06 μm using this magnetic paint in the same manner as in Example 9. However, the fluctuation of the thickness of the magnetic layer was large and thus a magnetic tape having a uniform thickness of the magnetic layer could not be produced.

The coercive force which was measured in the orientation direction of the magnetic tap, and the product (Br δ) of the residual magnetic flux density and the thickness of the magnetic tape were 66.7 kA/m and 0.024 μTm, respectively.

Comparative Example 4

An iron nitride powder was prepared in the same manner as in Example 8 except that magnetite having an average particle size of 25 nm was reduced by heating in a nitrogen stream at 400° C. for 2 hours without adhering yttrium and then nitrided in an ammonia stream at 150° C. for 30 hours.

The resultant magnetic powder was subjected to a fluorescent X-ray analysis, and it was found that the content of nitrogen was 8.9 atomic %. When the resultant magnetic powder was observed with a high resolution transmission electron microscope, the particles had a spherical or ellipsoidal shape and an average particle size of 75 μm. The powder had a BET specific surface of 14.9 m²/g. The X-ray diffraction pattern of this magnetic powder showed the profile corresponding to the $Fe_{16}N_2$ phase.

The magnetic powder had a saturation magnetization of 186.4 Am²/kg (186.4 emu/g) and a coercive force of 183.1 kA/m (2300 Oe) when measured with applying a magnetic field of 1270 kA/m (16 kOe).

The magnetic powder was produced by scaling up the above procedure by 100 times, and then a magnetic powder was prepared using this magnetic powder in the same manner as in Example 1. It was tried to prepare a magnetic tape with a thickness of 0.06 μm using this magnetic paint in the same manner as in Example 9. However, since the particle size was large and thus the fluctuation of the thickness of the magnetic layer was large, a magnetic tape having a uniform thickness of the magnetic layer could not be produced.

The coercive force which was measured in the orientation direction of the magnetic tap, and the product (Br δ) of the residual magnetic flux density and the thickness of the magnetic tape were 217.97 kA/m and 0.023 μTm, respectively.

The production conditions used in Examples 8-13 and Comparative Examples 2-4 are summarized in Table 2. The elementary compositions (atomic percentages of the rare earth elements and nitrogen), the presence of the $Fe_{16}N_2$ phase, the average particle sizes and the BET specific surface areas of the magnetic powders prepared in Examples 8-13 and Comparative Examples 2-4 are summarized in Table 3. Furthermore, the saturation magnetizations, coercive forces and storage stability (the saturation magnetization and the preservation rates of the saturation magnetization after storage) of the magnetic powders prepared in Examples 8-13 and Comparative Examples 2-4 are summarized in Table 4.

TABLE 2

| | Average particle size at raw material powder (nm) | Reduction conditions | | Nitriding conditions | |
|---|---|---|---|---|---|
| | | Temp. (° C.) | Time (hrs.) | Temp. (° C.) | Time (hrs.) |
| Ex. 8 | 25 | 450 | 2 | 150 | 30 |
| Ex. 9 | 20 | 450 | 2 | 150 | 30 |
| Ex. 10 | 30 | 450 | 2 | 150 | 30 |
| Ex. 11 | 25 | 450 | 2 | 150 | 30 |
| Ex. 12 | 25 | 450 | 2 | 130 | 30 |
| Ex. 13 | 25 | 450 | 2 | 170 | 30 |
| C. Ex. 2 | — | 450 | 2 | — | — |
| C. Ex. 3 | 25 | 400 | 2 | — | — |
| C. Ex. 4 | 25 | 400 | 2 | 150 | 30 |

TABLE 3

| | Composition (atm. %) | | Presence of $Fe_{16}N_2$ phase | Average particle size (nm) | BET specific surface area (m²/g) |
|---|---|---|---|---|---|
| | Rare earth element | Nitrogen | | | |
| Ex. 8 | 5.3 | 10.8 | Yes | 20 | 53.2 |
| Ex. 9 | 5.5 | 11.9 | Yes | 17 | 60.1 |
| Ex. 10 | 4.8 | 10.1 | Yes | 27 | 42.0 |
| Ex. 11 | 14.6 | 9.5 | Yes | 21 | 64.3 |
| Ex. 12 | 5.3 | 6.2 | Yes | 20 | 50.5 |
| Ex. 13 | 5.1 | 15.1 | Yes | 21 | 54.6 |
| C. Ex. 2 | 0 | — | No | 100 | — |
| C. Ex. 3 | 0 | — | No | 70 | 15.6 |
| C. Ex. 4 | 0 | 8.9 | Yes | 75 | 14.9 |

TABLE 4

| | Saturation magnetization (Am²/kg) | Coercive force (kA/m) | Storage stability | |
|---|---|---|---|---|
| | | | Saturation magnetization after storage (Am²/kg) | Retention rate % |
| Ex. 8 | 135.2 | 226.9 | 118.2 | 87.4 |
| Ex. 9 | 130.5 | 211.0 | 106.9 | 81.9 |
| Ex. 10 | 155.1 | 235.4 | 140.1 | 90.3 |
| Ex. 11 | 105.8 | 232.5 | 95.8 | 90.5 |
| Ex. 12 | 145.0 | 215.0 | 120.1 | 82.8 |
| Ex. 13 | 123.3 | 226.1 | 105.2 | 85.3 |
| C. Ex. 2 | 165.2 | 35.8 | — | — |
| C. Ex. 3 | 195.2 | 49.4 | — | — |
| C. Ex. 4 | 186.4 | 183.1 | — | — |

Example 14

A magnetic paint was prepared in the same manner as in Example 1 except that the yttrium-iron nitrogen magnetic powder (coercive force: 226.9 kA/m; saturation magnetization: 135.2 Am²/kg; particle size: 20 nm; particle shape: sphere or ellipsoid) prepared in Example 8 was used, and then this magnetic paint was coated on a non-magnetic support, oriented in the magnetic field, dried and calendered. The thickness of the magnetic layer after calendering was changed from 0.06 μm of Example 1 to 0.08 μm.

Furthermore, the plate oxide particles such as plate alumina and plate ITO, which were the same as those explained in Example 1, were used.

Using the magnetic paint, the primer paint and the backcoat paint, a magnetic tape was produced in the same manner as in Example 9. This magnetic tape was set in a DDS cartridge to obtain a computer tape. The coercive force which was measured in the orientation direction of the magnetic tap, and the product (Br·δ) of the residual magnetic flux density and the thickness of the magnetic tape were 283.6 kA/m and 0.027 μTm, respectively.

Example 15

A magnetic paint was prepared in the same manner as in Example 1 except that the yttrium-iron nitrogen magnetic powder (coercive force: 211.0 kA/m; saturation magnetization: 130.5 Am²/kg; particle size: 17 nm; particle shape: sphere or ellipsoid) prepared in Example 9 was used, and then this magnetic paint was coated on a non-magnetic support, oriented in the magnetic field, dried and calendered. The thickness of the magnetic layer after calendering was changed from 0.06 μm of Example 1 to 0.08 μm.

Furthermore, the plate oxide particles such as plate alumina and plate ITO, which were the same as those explained in Example 1, were used.

Using the magnetic paint, the primer paint and the backcoat paint, a magnetic tape was produced in the same manner as in Example 9. This magnetic tape was set in a DDS cartridge to obtain a computer tape. The coercive force which was measured in the orientation direction of the magnetic tap, and the product (Br·δ) of the residual magnetic flux density and the thickness of the magnetic tape were 280.6 kA/m and 0.024 μTm, respectively.

Comparative Example 5

A magnetic paint was prepared in the same manner as in Example 1 except that an acicular Fe—Co alloy magnetic powder (Co/Fe: 22.1 wt. %; coercive force: 195.0 kA/m; saturation magnetization: 108.7 Am²/kg; average major axis length: 60 nm; axis ratio: 5) was used as a magnetic powder. Then, using this magnetic powder, a magnetic tape was produced in the same manner as in Example 9. However, the thickness of the magnetic tape could not be controlled at 0.06 μm, but was increased to 0.09 μm.

This magnetic tape was set in a DDS cartridge to obtain a computer tape. The coercive force which was measured in the orientation direction of the magnetic tap, and the product (Br·δ) of the residual magnetic flux density and the thickness of the magnetic tape were 200.8 kA/m and 0.017 μTm, respectively.

With the magnetic tapes of Examples 9-15 and Comparative Examples 2-5, a coercive force (Hc), a saturation magnetic flux density (Bm), a squareness ratio (Br/Bm) and an anisotropic magnetic field distribution (Ha) were measured as the magnetic properties of the magnetic tapes.

The anisotropic magnetic field distribution was obtained by measuring a differential curve in the second quadrant of the hysteresis loop of the tape (demagnetization curve) and dividing a magnetic field corresponding to the half-width value of the differential curve by the coercive force of the tape. That is, as the coercive force distribution of the magnetic powder is narrower or the dispersion and orientation of the magnetic powder in the tape is better, Ha is smaller. When the coercive force is the same, the smaller Ha leads to the better recording characteristics in particular in the short wavelength range.

In addition, as electromagnetic conversion characteristics, a block error rate (BER) was measured using a DDS drive ("C 1554A" manufactured by Hewlett-Packard). That is, after the magnetic tape was run at 40° C. and 5% RH for 5 times, random data signals having the shortest wavelength of 0.33 μm were recorded on the magnetic tape, and then a block error rate was measured with a block error rate measuring device. The results of this measurement are also shown in Table 5 below.

TABLE 5

|  | Magnetic powder, Shape, Size (nm) | Thickness of magnetic layer (μm) | Coercive force (kA/m) | Br·δ (μTm) | Squareness ratio (Br/Bm) | Anisotropic magnetic field distribution (Ha) | Block error rate |
|---|---|---|---|---|---|---|---|
| Ex. 9 | Y—N—Fe Sphere 17 | 0.06 | 278.5 | 0.019 | 0.80 | 0.50 | 5xE−04 |
| Ex. 10 | Y—N—Fe Sphere 27 | 0.06 | 294.3 | 0.023 | 0.84 | 0.48 | 2xE−03 |
| Ex. 11 | Y—N—Fe Sphere 21 | 0.06 | 297.6 | 0.017 | 0.81 | 0.45 | 8xE−04 |
| Ex. 12 | Y—N—Fe Sphere 20 | 0.06 | 266.6 | 0.022 | 0.83 | 0.51 | 6xE−04 |
| Ex. 13 | Y—N—Fe Sphere 20 | 0.06 | 293.9 | 0.019 | 0.82 | 0.45 | 5xE−04 |
| Ex. 14 | Y—N—Fe Sphere | 0.08 | 283.6 | 0.027 | 0.84 | 0.46 | 7xE−04 |

TABLE 5-continued

|  | Magnetic powder, Shape, Size (nm) | Thickness of magnetic layer (μm) | Coercive force (kA/m) | Br·δ (μm) | Squareness ratio (Br/Bm) | Anisotropic magnetic field distribution (Ha) | Block error rate |
|---|---|---|---|---|---|---|---|
| Ex. 15 | Y—N—Fe Sphere 20 17 | 0.08 | 280.6 | 0.024 | 0.81 | 0.49 | 7xE–04 |
| C Ex. 2 | Fe Sphere to amorphous 100 | 0.50 | 46.5 | 0.020 | 0.33 | >1.0 | >1xE – 01 |
| C. Ex. 3 | Fe Sphere to amorphous 70 | 0.35 | 66.7 | 0.024 | 0.38 | >1.0 | >1xE–01 |
| C. Ex. 4 | N—Fe Sphere to amorphous 75 | 0.20 | 217.9 | 0.023 | 0.72 | >1.0 | >1xE–01 |
| C. Ex. 5 | Fe—Co Needle 60 | 0.09 | 200.8 | 0.017 | 0.84 | 0.61 | 8xE–03 |

As can be understood from the results in Tables 3 and 4, the rare earth element-iron nitride magnetic powders prepared in Examples 8-13 had the substantially spherical or ellipsoidal shape and a particle size of 5 to 50 nm which are most suitable for a very thin magnetic recording media having a magnetic layer with a thickness of 0.09 μm or less. In addition, although those magnetic powders had such a spherical or ellipsoidal shape, they had a high coercive force and a saturation magnetization particularly suitable for high density recording, and also the good storage stability of the saturation magnetization.

As can be understood from the results of Examples 9-15 in Table 5, the rare earth element-iron nitride magnetic powders of the present invention exhibited a high magnetic field orientation due to their good magnetic anisotropy, although they had the spherical shape in the magnetic recording media. Furthermore, the good anisotropic magnetic field distribution of the magnetic recording media of the present invention reflects the narrow coercive force distribution of the magnetic powders of the present invention. Because of the small anisotropic magnetic field distribution, the block error rate, which is one of the electromagnetic conversion characteristics, is small and thus the reliability of the magnetic tapes is improved.

The excellent properties of the magnetic recording media of the present invention as the high density recording media more apparently appear when the rare earth element-iron nitride magnetic powder having the composition represented by $Fe_{16}N_2$ is used as a magnetic powder.

Although the magnetic powders of Comparative Examples 2-4 had the shape close to a sphere, they could not be used in a thin magnetic recording medium having a magnetic layer with a thickness of 0.09 μm or less, since they had a large particle size of 50 nm or more. Since the magnetic powders of Comparative Examples 2 and 3 did not contain any rare earth element, they had a smaller coercive force than the magnetic powders of the present invention. Furthermore, the magnetic powder of Comparative Example 4 had a relatively high coercive force since it comprised iron nitride, but its particle size could not be decreased to 5 to 50 nm which is suitable for a high density recording magnetic medium, since it contained no rare earth element.

The magnetic tape using the acicular magnetic powder of is Comparative Example 5 had a high coercive force and a good orientation property, but its anisotropic magnetic field was inferior to that of the magnetic tapes of the present invention, and therefore it has a worse block error rate that the magnetic tapes of the present invention. This may be because the magnetic powder of the present invention has the substantially spherical or ellipsoidal shape, while the acicular particles have a broad particle size distribution so that the coercive force distribution of the magnetic powder may be broadened.

Furthermore, such an acicular magnetic powder is not essentially suitable for a magnetic recording medium having a thin magnetic layer. In the case of a thin magnetic layer, the number of the particles of the acicular magnetic powder, which protrude from the surface of the magnetic layer, increases and thus the recording tends to be less uniform when signals are recorded, and noise is generated when the signals are reproduced. This is the essential problem of the acicular magnetic powder, and the block error rate may be a major cause therefor.

As described above, the rare earth element-iron type magnetic powders used in Examples have a high coercive force due to the uniaxial magnetic anisotropy in spite of their spherical or ellipsoidal particle shape, and they have a saturation magnetization suitable for high density recording in spite of the ultrafine particles. In particular, the rare earth element-iron nitride magnetic powder having the composition represented by $Fe_{16}N_2$ as a rare earth element-iron type magnetic powder has a higher coercive force and is most suitable as a magnetic powder for a helical scan type magnetic recording medium.

EFFECTS OF THE INVENTION

As explained above, according to the present invention, a computer magnetic tape for linear recording has excellent electromagnetic conversion characteristics (C and C/N), and excellent stability against temperature and humidity. Thereby, it is possible to provide a magnetic tape and a magnetic recording cartridge for a computer, which can cope with a recording capacity of 1 TB or more. Furthermore, according to the present invention, a helical scan type magnetic tape for a computer has a good block error rate, and therefore it can be used as a back-up tape for a computer, which can cope with a high recording capacity.

The invention claimed is:

1. A magnetic recording medium comprising
  a non-magnetic support,
  at least one primer layer formed on one surface of the non-magnetic support, comprising a non-magnetic powder and a binder resin,
  at least one magnetic layer formed on the primer layer, comprising a magnetic powder and a binder resin, and
  a back layer formed on the other surface of the nonmagnetic support,
  wherein the magnetic powder contained in an uppermost layer of the magnetic layer is a magnetic powder of substantially spherical or ellipsoidal particles comprising a rare earth element, iron and optionally at least one other transition metal,
  and has a number average particle size of 5 to 50 nm and an average axis ratio of 1 to 2,
  and the total thickness of the magnetic recording medium is less than 6 μm,
  wherein said magnetic powder particles in said uppermost magnetic layer comprise an outer layer part and a core part,
  wherein said uppermost magnetic layer has a product of a residual magnetic flux density (Br) and a thickness of 0.0018 μTm to 0.05 μTm,
  wherein the rare earth element is present primarily in the outerlayer part, and the core part comprises $Fe_{16}N_2$ phase and optionally at least one transition metal other than iron, "and wherein boron is not present in the magnetic powder particles".

2. The magnetic recording medium according to claim 1, wherein said uppermost magnetic layer has a thickness of 0.09 μm or less.

3. The magnetic recording medium according to claim 1, wherein said back layer is a backcoat layer comprising carbon black powder and a binder.

4. The magnetic recording medium according to claim 1, wherein said uppermost magnetic layer has a coercive force of 180 kA/m to 400 kA/m.

5. The magnetic recording medium according to claim 1, wherein said magnetic powder in said uppermost magnetic layer has a number average particle size of 5 to 30 nm.

6. The magnetic recording medium according to claim 1, wherein a content of the rare earth element in said magnetic powder is from 0.05 to 20 atomic % based on the amount of iron.

7. The magnetic recording medium according to claim 1, wherein a content of the rare earth element in said magnetic powder is from 0.5 to 15 atomic % based on the amount of iron.

8. The magnetic recording medium according to claim 1, wherein said magnetic powder further comprises nitrogen having a concentration of from 1.0 to 20 atomic % based on the amount of iron.

9. The magnetic recording medium according to claim 1, wherein said magnetic powder further comprises nitrogen having a concentration of from 2.0 to 12.5 atomic % based on the amount of iron.

10. The magnetic recording medium according to claim 1, wherein the rare earth element in said magnetic powder is at least one element selected from the group consisting of samarium, neodymium and yttrium.

11. A magnetic recording cartridge comprising a box-shaped casing body, and a reel set inside said casing body, around which reel a magnetic recording medium according to claim 1 is wound,
  wherein magnetic recording signals which are recorded on said magnetic recording medium are reproduced with a magneto-resistance effect head (MR head).

12. A magnetic recording cartridge comprising a box-shaped casing body, and a reel set inside said casing body, around which reel a magnetic recording medium according to claim 1 is wound,
  wherein said magnetic recording medium is tracked with servo signals recorded on said magnetic recording medium.

13. The magnetic recording cartridge according to claim 12, wherein said servo signals are recorded on at least one of said magnetic layer and said back layer of said magnetic recording medium.

14. The magnetic recording cartridge according to claim 13, wherein said servo signals are at least one selected from the group consisting of magnetic servo signals and optical servo signals.

15. The magnetic recording cartridge according to claim 13, wherein said servo signals are magnetic servo signals, and said magnetic servo signals are reproduced with a magneto-resistance effect head (MR head).

* * * * *